(12) United States Patent
Fukui et al.

(10) Patent No.: US 12,079,528 B2
(45) Date of Patent: Sep. 3, 2024

(54) STORAGE MEDIUM STORING INSTRUCTIONS USING PRINTING DEVICES TO CREATE PRINT LABELS TO BE USED IN OVERLAID STATE

(71) Applicant: BROTHER KOGYO KABUSHIKI KAISHA, Nagoya (JP)

(72) Inventors: Tomoyasu Fukui, Inuyama (JP); Ryuichi Kanda, Nagoya (JP); Koichi Kondo, Inuyama (JP); Hiromichi Nampo, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/388,987

(22) Filed: Jul. 29, 2021

(65) Prior Publication Data

US 2022/0035584 A1    Feb. 3, 2022

(30) Foreign Application Priority Data

Jul. 30, 2020   (JP) .................................. 2020-129395

(51) Int. Cl.
*G06F 3/12*   (2006.01)

(52) U.S. Cl.
CPC .......... *G06F 3/1243* (2013.01); *G06F 3/1206* (2013.01)

(58) Field of Classification Search
None
See application file for complete search history.

(56) References Cited

U.S. PATENT DOCUMENTS

2002/0198989 A1\* 12/2002 Kimura ............... H04L 41/0213
709/224
2007/0011312 A1\* 1/2007 Nakamura ............ H04W 24/00
709/224
(Continued)

FOREIGN PATENT DOCUMENTS

JP   2003-006066 A    1/2003
JP   2007-317151 A   12/2007
(Continued)

OTHER PUBLICATIONS

Japanese Office Action for the related Japanese Patent Application No. 2020-129395 dated Apr. 5, 2024.
(Continued)

*Primary Examiner* — Eric A. Rust
(74) *Attorney, Agent, or Firm* — Kenealy Vaidya LLP

(57) ABSTRACT

A non-transitory computer-readable storage medium stores computer-readable instructions for a terminal device including a processor. The computer-readable instructions, when executed by the processor, causes the terminal device to perform: generating a plurality of sets of label data for creating a plurality of print labels, each set of label data including print data and attribute specification information; acquiring a plurality of sets of medium type information for a plurality of printing devices, each set of medium type information indicating a type of a printing medium mounted in the corresponding printing device; determining a plurality of output destinations for the plurality of sets of print data from among the plurality of printing devices on the basis of the plurality of sets of label data and the plurality of sets of medium type information; and transmitting each of the plurality of sets of print data to the corresponding output destination.

15 Claims, 11 Drawing Sheets

(56) References Cited

U.S. PATENT DOCUMENTS

| | | | |
|---|---|---|---|
| 2007/0262141 A1* | 11/2007 | Ito | G06F 3/126 |
| | | | 235/383 |
| 2009/0296140 A1 | 12/2009 | Sugiyama et al. | |
| 2014/0307268 A1 | 10/2014 | Sun | |
| 2016/0328190 A1* | 11/2016 | Platts | G06K 15/1807 |
| 2018/0143792 A1* | 5/2018 | Chau | G06F 3/1285 |
| 2020/0307849 A1* | 10/2020 | Kakinoki | B65C 9/46 |
| 2020/0371722 A1* | 11/2020 | Sato | G06F 3/1204 |

FOREIGN PATENT DOCUMENTS

| | | | |
|---|---|---|---|
| JP | 2008-210086 A | 9/2008 |
| JP | 2010-017937 A | 1/2010 |
| JP | 2012-053512 A | 3/2012 |
| JP | 2012-063807 A | 3/2012 |
| JP | 2012-254566 A | 12/2012 |
| JP | 2014-203436 A | 10/2014 |
| JP | 2015-066826 A | 4/2015 |
| JP | 2018-008476 A | 1/2018 |

OTHER PUBLICATIONS

Japanese Office Action for the related Japanese Patent Application No. 2020-129395 dated Jul. 12, 2024.

* cited by examiner

FIG. 9

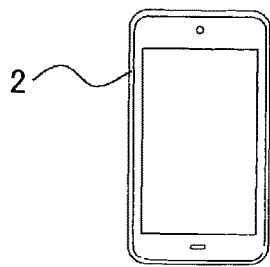
2

LABEL DATA FOR TOP LABEL

{ TAPE WIDTH: 12mm
TAPE COLOR: TRANSPARENT
PRINTING COLOR: RED }

LABEL DATA FOR MIDDLE LABEL

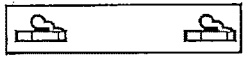

{ TAPE WIDTH: 12mm
TAPE COLOR: TRANSPARENT
PRINTING COLOR: BLUE }

LABEL DATA FOR BOTTOM LABEL

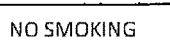

{ TAPE WIDTH: 12mm
TAPE COLOR: WHITE
PRINTING COLOR: BLACK }

TRANSMIT PRINT DATA | TRANSMIT PRINT DATA AFTER LOW-RESOLUTION PRINTING IS PERMITTED | TRANSMIT PRINT DATA

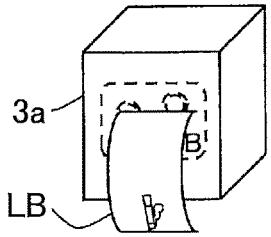
LB
RESOLUTION: 300dpi

MOUNTED CARTRIDGE B
TAPE WIDTH: 12mm
TAPE COLOR: TRANSPARENT
PRINTING COLOR: BLUE

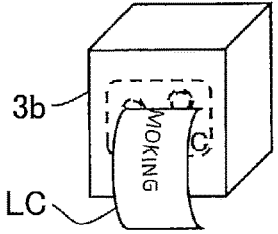
LC
RESOLUTION: 180dpi

MOUNTED CARTRIDGE C
TAPE WIDTH: 12mm
TAPE COLOR: WHITE
PRINTING COLOR: BLACK

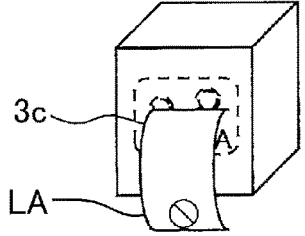
LA
RESOLUTION: 300dpi

MOUNTED CARTRIDGE A
TAPE WIDTH: 12mm
TAPE COLOR: TRANSPARENT
PRINTING COLOR: RED

STORAGE MEDIUM STORING INSTRUCTIONS USING PRINTING DEVICES TO CREATE PRINT LABELS TO BE USED IN OVERLAID STATE

CROSS REFERENCE TO RELATED APPLICATION

This application claims priority from Japanese Patent Application No. 2020-129395 filed Jul. 30, 2020. The entire content of the priority application is incorporated herein by reference.

TECHNICAL FIELD

The present disclosure relates to a non-transitory computer-readable storage medium storing a set of computer-readable instructions, and a printing process method.

BACKGROUND

Japanese Patent Application Publication No. 2012-254566 describes a technology for creating a plurality of print labels that are overlaid on each other. In this technology, an operation terminal outputs print data to a plurality of printing devices that print using mutually different types of printing media.

SUMMARY

When creating a plurality of print labels by generating and outputting print data to a plurality of printing devices as in the conventional technology described above, the types of printing media actually mounted in the printing devices must be suitable for creating the plurality of print labels.

However, the conventional technology described above does not give any particular consideration for whether the types of printing media are suitable for the creation of the print labels. Consequently, if a printing medium mounted in any of the printing devices is not compatible with the print label to be created on that printing device, the operator may need to change the output destination for the print data, adjust the print data, exchange the printing medium mounted in the device, or the like. In such cases, the plurality of print labels to be overlaid on each other cannot easily be created in a short amount of time.

In view of the foregoing, it is an object of the present disclosure to provide: a non-transitory computer-readable storage medium storing a set of computer-readable instructions for reliably and quickly creating a plurality of print labels in desired forms to be used in an overlaid state; and a printing process method for reliably and quickly creating a plurality of print labels in desired forms to be used in an overlaid state.

In order to attain the above and other objects, according to one aspect, the present disclosure provides a non-transitory computer-readable storage medium storing a set of computer-readable instructions for a terminal device, the terminal device including a processor and a communication interface enabling the terminal device to communicate with a plurality of printing devices in which a printing medium is mountable. The set of computer-readable instructions, when executed by the processor, causes the terminal device to perform: (a) generating a plurality of sets of label data for creating respective ones of a plurality of print labels to be overlaid on each other in their thickness direction, each set of label data including print data indicating a printing content for the corresponding print label and attribute specification information specifying printing medium attributes to be used to create the corresponding print label; (b) acquiring a plurality of sets of medium type information for respective ones of the plurality of printing devices through the communication interface, each set of medium type information indicating a type of the printing medium mounted in the corresponding printing device; (c) determining a plurality of output destinations for respective ones of the plurality of sets of print data from among the plurality of printing devices on the basis of the plurality of sets of label data generated in (a) and the plurality of sets of medium type information acquired in (b); and (d) transmitting each of the plurality of sets of print data to the corresponding output destination determined in (c).

According to another aspect, the present disclosure provides a printing process method of using a plurality of printing devices to create a plurality of print labels to be overlaid on each other in their thickness direction, the printing process method comprising: (a) generating: first label data for creating a first print label, the first label data including first print data and first attribute specification information, the first print data indicating a first printing content for the first print label, the first attribute specification information specifying printing medium attributes to be used to create the first print label; and second label data for creating a second print label, the second label data including second print data and second attribute specification information, the second print data indicating a second printing content for the second print label, the second attribute specification information specifying printing medium attributes to be used to create the second print label; (b) acquiring first medium type information indicating a type of a printing medium mounted in a first printing device; (c) acquiring second medium type information indicating a type of a printing medium mounted in a second printing device; (d) transmitting the first print data to the first printing device when the first medium type information matches the first attribute specification information; and (e) transmitting the second print data to the second printing device when the second medium type information matches the second attribute specification information.

According to still another aspect, the present disclosure provides a non-transitory computer-readable storage medium storing a set of computer-readable instructions for a terminal device, the terminal device including a processor and a communication interface. The set of computer-readable instructions, when executed by the processor, causes the terminal device to perform: (a) generating: first label data for creating a first print label, the first label data including first print data and first attribute specification information, the first print data indicating a first printing content for the first print label, the first attribute specification information specifying printing medium attributes to be used to create the first print label; and second label data for creating a second print label, the second label data including second print data and second attribute specification information, the second print data indicating a second printing content for the second print label, the second attribute specification information specifying printing medium attributes to be used to create the second print label; (b) acquiring, through the communication interface, first medium type information indicating a type of a printing medium mounted in a first printing device; (c) acquiring, through the communication interface, second medium type information indicating a type of a printing medium mounted in a second printing device; (d) transmitting the first print data to the first printing device when the first medium type information matches the first attribute specification information; and (e) transmitting the second print data to the second printing device when the second medium type information matches the second attribute specification information.

BRIEF DESCRIPTION OF THE DRAWINGS

The particular features and advantages of the embodiment(s) as well as other objects will become apparent from the following description taken in connection with the accompanying drawings, in which:

FIG. 9 is an explanatory view illustrating another example of the manner in which print data is distributed and transmitted to the corresponding label printers suitable for creating print labels in the variation of setting output destinations with consideration for printing resolutions;

DETAILED DESCRIPTION

Next, one embodiment of the present disclosure will be described while referring to the accompanying drawings.

<Overall Structure of a Printing System>

Figure 1:
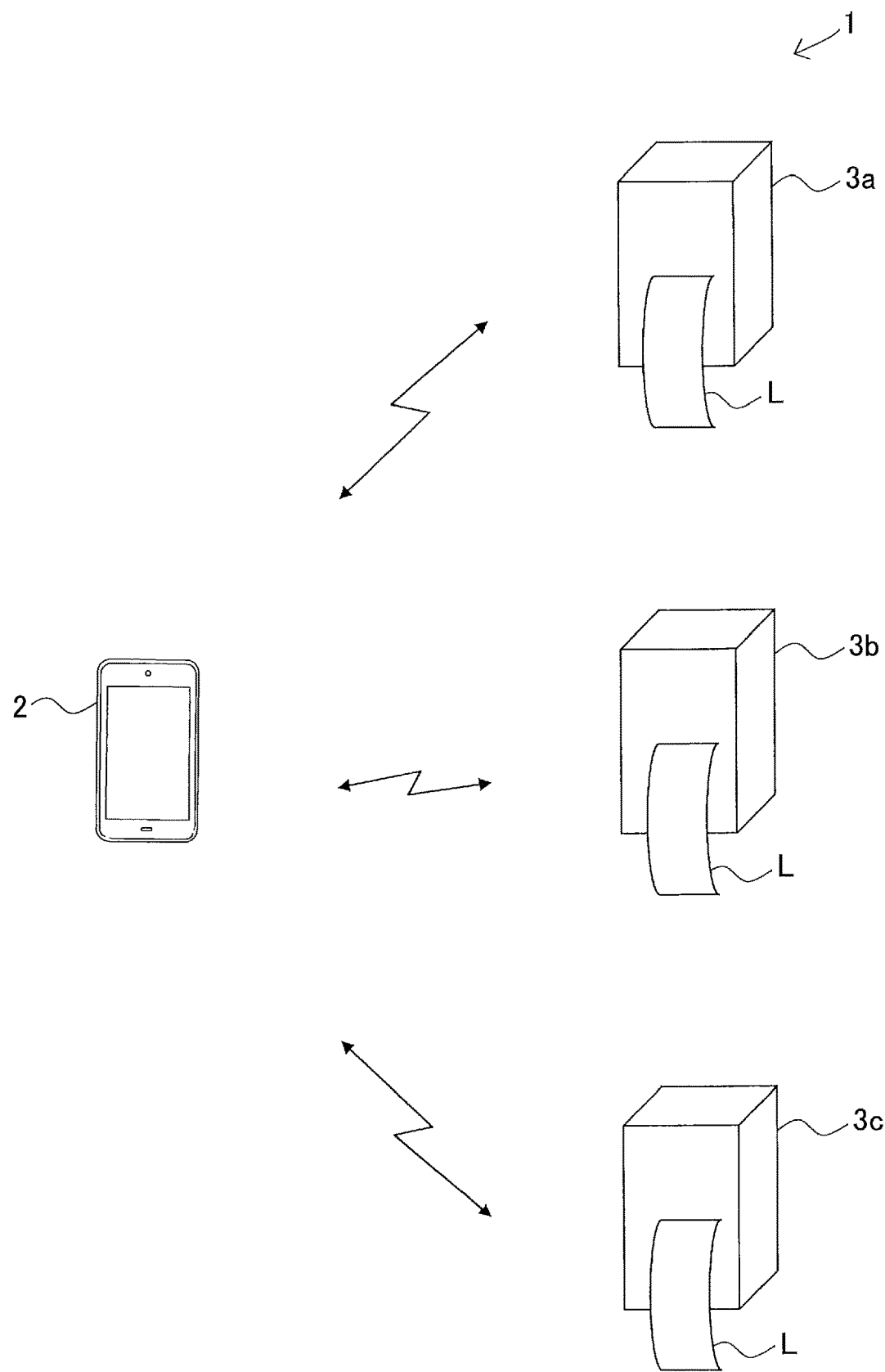
FIG. 1 is a schematic view illustrating an overall structure of a printing system according to one embodiment of the present disclosure.

FIG. 1 shows the overall structure of a printing system 1 according to the present embodiment. In the example of FIG. 1, the printing system 1 includes an operation terminal 2 and a plurality of label printers 3. For example, the operation terminal 2 is configured of a smartphone. The plurality of label printers 3 are each connected to the operation terminal 2. In this example, three label printers 3a, 3b, and 3c are wirelessly connected to the operation terminal 2. Each of the label printers 3a-3c can exchange information with the operation terminal 2. As an alternative to the smartphone, the operation terminal 2 may be configured of a general-purpose personal computer or the like. The label printers 3a-3c are configured to create print labels L in response to user operations performed on the operation terminal 2. For convenience, the label printers 3a, 3b, 3c, and the like will simply be called label printers 3. The operation terminal 2 is an example of the terminal device. The plurality of label printers 3 is an example of the plurality of printing devices.

<Operation Terminal>

Figure 2:
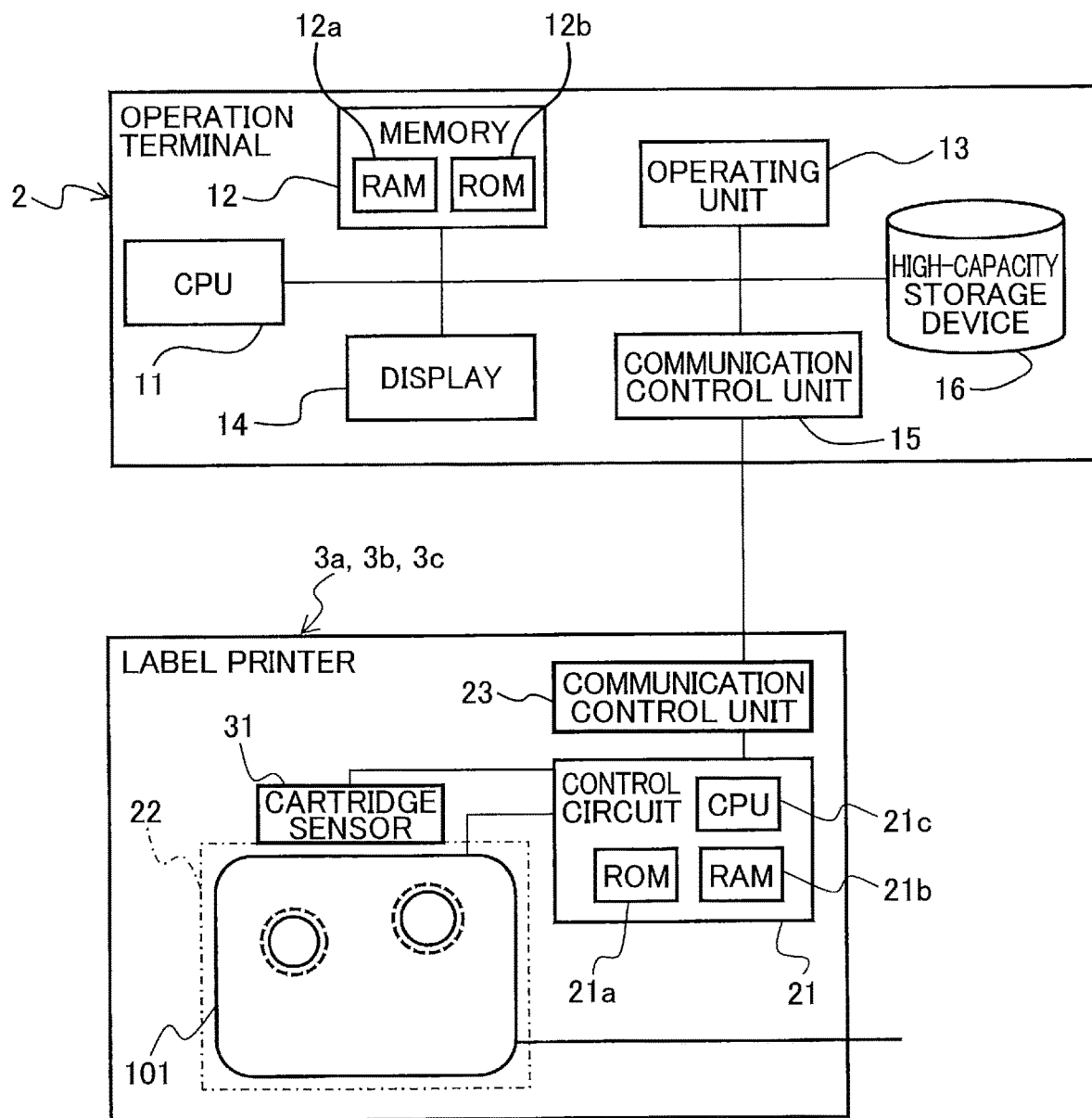
FIG. 2 is a functional block diagram illustrating functional configurations of a terminal device and label printers that are included in the printing system.

As shown in FIG. 2, the operation terminal 2 includes a CPU 11, a memory 12, an operating unit 13, a display unit 14, a communication control unit 15, and a high-capacity storage device 16. The memory 12 includes a RAM 12a, a ROM 12b, and the like, for example. The CPU 11 is an example of the processor. The communication control unit 15 is an example of the communication interface.

The user inputs instructions and information on the operating unit 13. The display unit 14 displays various information and messages. Note that the operating unit 13 and display unit 14 may be configured as a touchscreen that possesses functions of both the operating unit 13 and display unit 14. The communication control unit 15 controls the exchange of signals (information) with the label printers 3.

The high-capacity storage device 16 stores various programs and information. The ROM 12b of the memory 12 stores a printing process program for the CPU 11 to execute the steps in the flowcharts of FIGS. 6 and 7 described later. As an alternative, the printing process program may be stored in the high-capacity storage device 16. Note that the high-capacity storage device 16 is not limited to a built-in memory, but may be a suitable external memory such as an SD Card. The ROM 12b storing the printing process program is an example of the non-transitory computer-readable storage medium.

The CPU 11 uses the temporary storage function of the RAM 12a to perform the various processes and to exchange various signals (various information) with the label printers 3 according to programs pre-stored in the ROM 12b and the high-capacity storage device 16.

<Label Printers>

As shown in FIG. 2, each of the label printers 3 includes a control circuit 21, a cartridge holder 22, a cartridge sensor 31 provided in the cartridge holder 22, and a communication control unit 23. The control circuit 21 includes a ROM 21a, a RAM 21b, and a CPU 21c. A cartridge 101 is detachably mountable in the cartridge holder 22. The cartridge 101 is an example of the medium accommodation body. The cartridge holder 22 is an example of the mounting portion.

The cartridge sensor 31 is configured to detect the type of the cartridge 101 mounted in the label printer 3 (the cartridge holder 22) according to a suitable method known in the art, such as mechanical detection or optical or magnetic detection.

The label printer 3 can exchange information with the operation terminal 2 when the control circuit 21 is connected to the communication control unit 15 of the operation terminal 2 via the communication control unit 23.

<Cartridge and Cartridge Holder>

Figure 3:
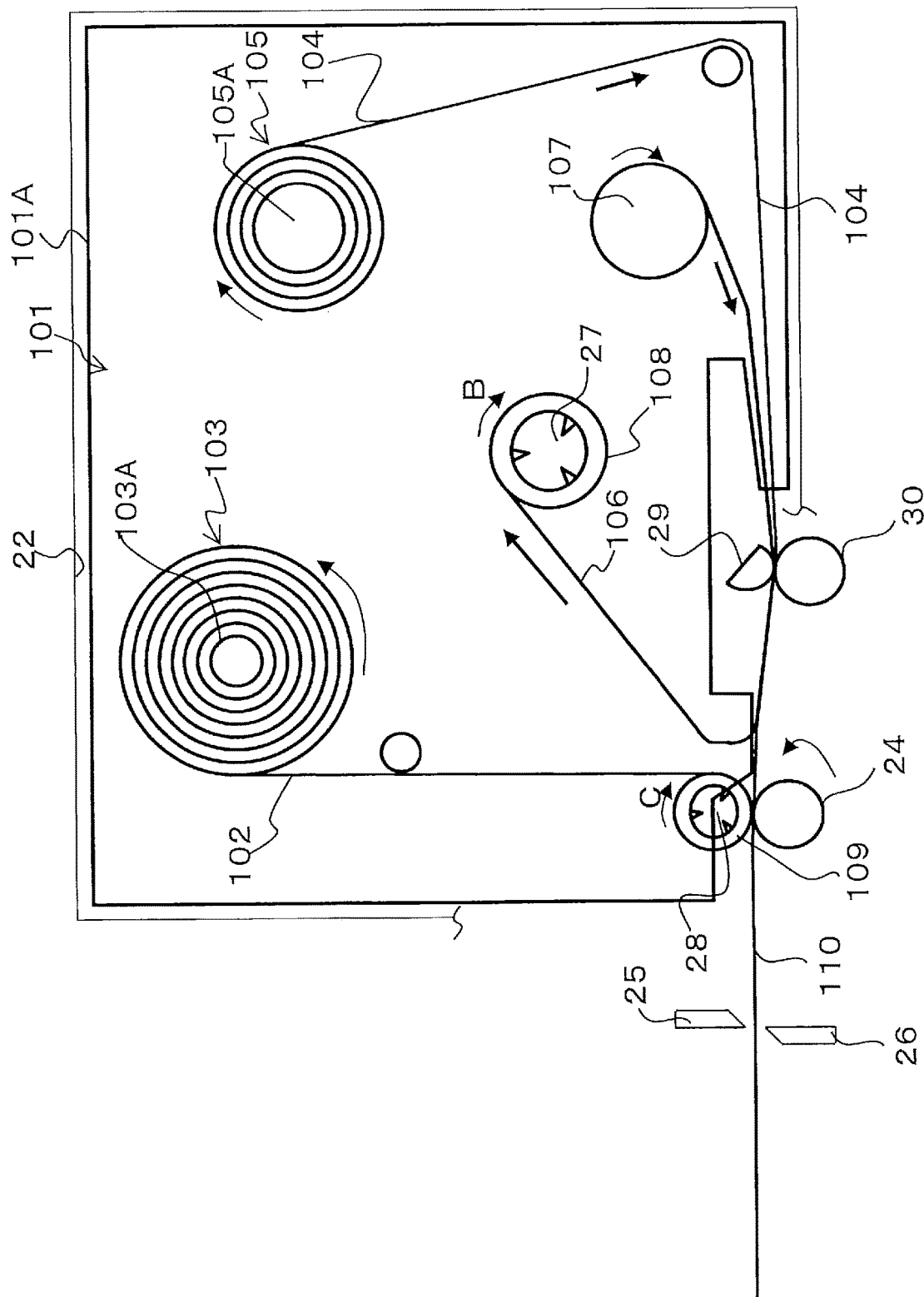
FIG. 3 is a schematic diagram of the internal structure of a cartridge mountable in the printing device.

FIG. 3 shows a detailed structure of the cartridge 101 and the related structure of the cartridge holder 22. The cartridge 101 has a housing 101A, a first roll 103, a second roll 105, a ribbon supply roll 107, a ribbon take-up roller 108, and a tape feed roller 109.

The first roll 103 is a roll formed by winding a base tape 102 around a reel member 103A and is disposed in the housing 101A. The base tape 102 is configured of a bonding adhesive layer, a base layer, a mounting adhesive layer, and a release layer, for example. These layers are laminated sequentially from the inward-facing side of the wound base tape 102 forming the first roll 103 toward the opposite side.

The second roll 105 is a roll formed by winding a transparent cover film 104 about a reel member 105A. The transparent cover film 104 has the same width as the base tape 102. Note that, while depicted as concentric circles in the drawings for simplification, the first roll 103 and second roll 105 are actually wound in a spiral shape.

The cover film 104, base tape 102, and the like are indirectly mounted in the cartridge holder 22 (the label printer 3) by mounting the cartridge 101 in the cartridge holder 22, as described above.

The ribbon supply roll 107 pays out an ink ribbon 106. The ribbon take-up roller 108 takes up the ink ribbon 106 that has been used for printing. Note that the ink ribbon 106 is unnecessary in a case where the cover film 104 is a thermal tape that can produce a prescribed color when heated. The base tape 102, the cover film 104, and the ink ribbon 106 are an example of the printing medium.

The tape feed roller 109 is rotatably supported near a tape discharge portion of the cartridge 101. The tape feed roller 109 bonds the base tape 102 to the cover film 104 with pressure to form a print label tape 110 while conveying the same.

A ribbon take-up roller drive shaft 27 and a tape feed roller drive shaft 28 are provided in the cartridge holder 22. The ribbon take-up roller drive shaft 27 is provided for taking up the portion of the ink ribbon 106 already used for printing. The tape feed roller drive shaft 28 is provided for conveying the print label tape 110 described above. When the drive force of a conveying roller motor (not shown) is transmitted to the ribbon take-up roller drive shaft 27 and tape feed roller drive shaft 28, the ribbon take-up roller 108 and tape feed roller 109 are driven to rotate in conjunction with each other.

The cartridge holder 22 is also provided with a print head 29 that prints desired content on the cover film 104 as the cover film 104 is conveyed.

A fixed blade 25 and a movable blade 26 are provided along the conveying path of the print label tape 110 on the downstream side of the tape feed roller 109 and a pressure roller 24. The movable blade 26 is configured to cut through the print label tape 110 in the thickness direction in cooperation with the fixed blade 25.

<Outline of Label Printer Operations>

In the label printer 3 having the above construction, when the cartridge 101 is mounted in the cartridge holder 22, the cover film 104 and ink ribbon 106 become interposed between the print head 29 and a platen roller 30 opposing the print head 29. At the same time, the base tape 102 and cover film 104 become interposed between the tape feed roller 109 and the pressure roller 24 opposing the tape feed roller 109.

When the ribbon take-up roller 108 and tape feed roller 109 are driven to rotate in synchronization along the directions indicated by the respective arrows B and C in FIG. 3, the pressure roller 24 and platen roller 30 rotate, whereupon the base tape 102 is paid out from the first roll 103 and supplied to the tape feed roller 109 and the cover film 104 is paid out from the second roll 105. The print head 29 prints on the cover film 104 by a plurality of heating elements in the print head 29 being energized by a print driving circuit (not shown). The ribbon take-up roller drive shaft 27 drives the ribbon take-up roller 108 to take up the ink ribbon 106 that has been used for printing on the cover film 104.

The base tape 102 and the printed portion of the cover film 104 are integrally bonded between the tape feed roller 109 and the pressure roller 24 to form the print label tape 110, and the print label tape 110 is conveyed out of the cartridge 101. The portion of the print label tape 110 that has been conveyed out of the cartridge 101 is cut off through the cooperative operations of the fixed blade 25 and movable blade 26, producing a print label L.

<Composite Labels>

In the present embodiment, a plurality of uniquely different print labels L is overlaid in the thickness direction and bonded to each other. In their bonded state, the print labels L are then stuck onto a desired object. In this example, three print labels L are created on the label printers 3a-3c. More specifically, different types of cartridges 101 are mounted in the label printers 3 in the present embodiment, and these label printers 3 are used to create a plurality of uniquely different print labels L to be overlaid on each other, as described above. Some examples of these print labels L will be described next with reference to FIGS. 4A-4C.

Figure 4A:
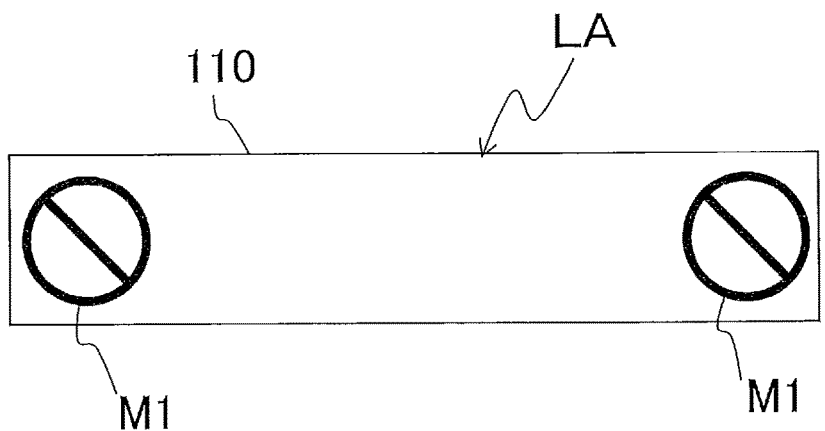
FIGS. 4A-4D are explanatory views illustrating an example of creation of one print label by overlying three print labels, FIG. 4A showing one print label forming the topmost layer when the three print labels are overlaid, FIG. 4B showing another print label forming the middle layer when the three print labels are overlaid, FIG. 4C showing the other print label forming the bottom layer when the three print labels are overlaid, FIG. 4D showing a composite label created by sequentially overlaying the three print labels.
Figure 4B:
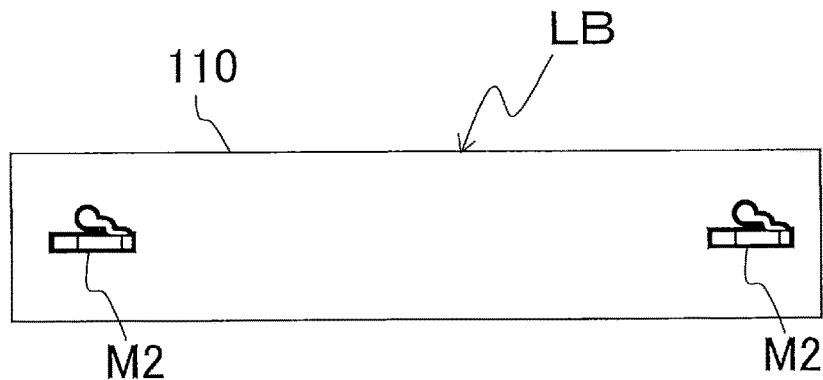
Figure 4C:
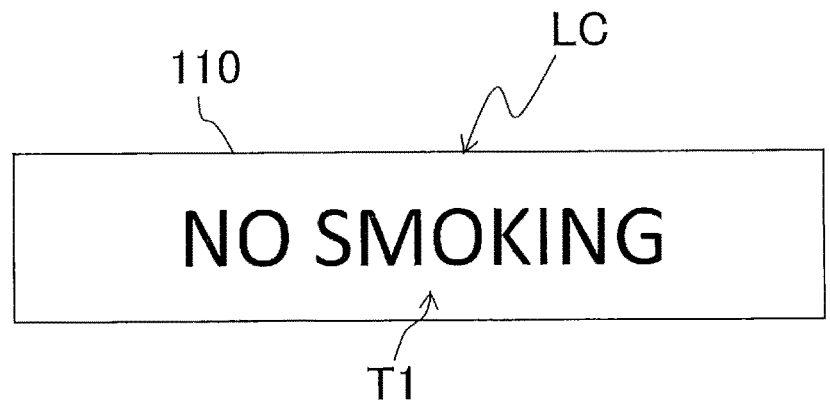

FIG. 4A shows one print label LA that forms the topmost layer when the three print labels are overlaid. In this example, a red prohibited mark M1 including a circle with a diagonal line through the middle is formed on each longitudinal end of the print label LA. FIG. 4B shows another print label LB that forms the middle layer when the three print labels are overlaid. In this example, a blue cigarette icon M2 depicting a smoking cigarette is formed on each longitudinal end of the print label LB. FIG. 4C shows another print label LC that constitutes the bottommost layer when the three print labels are overlaid. In this example, black text T1 including the character string "NO SMOKING" is formed along the longitudinal center region of the print label LC.

Figure 4D:
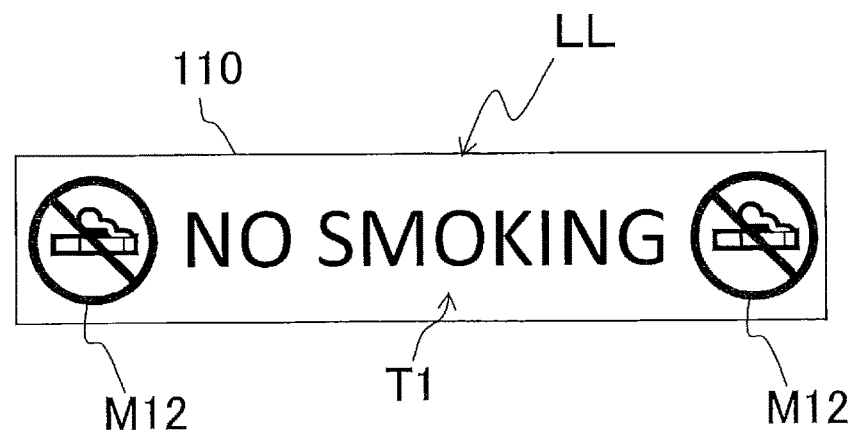

In this example, the print label tape 110 for creating the print label LA in FIG. 4A and the print label tape 110 for creating the print label LB in FIG. 4B each has a transparent color. Accordingly, a print label LL shown in FIG. 4D is created by sequentially overlaying the print label LA as the topmost layer, the print label LB as the middle layer, and the print label LC as the bottom layer, as described above. In the following description, the print label LL will be called the "composite label LL." Further, the print label LA will be called the "top label LA," the print label LB will be called the "middle label LB," and the print label LC will be called the "bottom label LC."

As a result of overlaying the print labels LA-LC, the prohibited marks M1 and cigarette icons M2 on both longitudinal ends of the respective top label LA and middle label LB overlap to configure composite no smoking marks M12 in the composite label LL. Further, the text T1 described above is arranged between the two no smoking marks M12. For convenience in the following description, the prohibited marks M1, cigarette icons M2, and no smoking marks M12 will simply be called "marks M," and these marks M and the text T1 will be called "print objects."

Note that the top label LA, middle label LB, and bottom label LC in this example all have the same width and the same length. Thus, the composite label LL is created by overlaying the top label LA shown in FIG. 4A, the middle label LB shown in FIG. 4B, and the bottom label LC shown in FIG. 4C so that they are precisely aligned with each other.

As described above, a cartridge 101 is used in the label printer 3 by mounting the cartridge 101 in the cartridge holder 22 of the label printer 3. Therefore, a variety of print labels L can be created by suitably using a variety of cartridges 101 mounted in label printers 3. Here, it is possible to create print labels L having different tape colors from each other by selectively using a plurality of types of cartridges 101 that generate print label tapes 110 having different colors, for example. The color of the print label, i.e., the tape color of the print label tape 110 is an example of the color of the printing medium.

Similarly, by selectively using a plurality of types of cartridges 101 having different colors of ink ribbons 106, it is possible to create print labels L having different printing colors used to print the above-described print objects. Note that at least one of the cover film 104 and base tape 102 used for creating the print labels may be common if the ink ribbon 106 is varied, and at least one of the cover film 104 and ink ribbon 106 used for creating the print labels may be common if the base tape 102 is varied. These cases are equivalent to the use of mutually different types of printing media.

Feature of the Present Embodiment

One feature of the present embodiment having the above configuration is the process of having a plurality of label printers 3 share creation of a plurality of print labels L. Next, a case in which the top label LA, middle label LB, and bottom label LC described above are assigned to and created by the three label printers 3a-3c will be described in detail as an example.

<Print Data>

In the present embodiment, the top label LA, middle label LB, and bottom label LC described above are created by printing the corresponding print objects on the cover films 104 in three mutually different types of cartridges 101. To create these labels, print data representing the printing content for the top label LA, print data representing the middle label LB, and print data representing the bottom label LC are generated on the operation terminal 2 and these sets of print data are distributed and outputted to the label printers 3a-3c. The printing content includes characters, patterns, icons, images, and the like that are printed by the respective print heads 29. The print data also includes a specification for the printing color of the ink ribbons 106. That is, each set of print data specifies the printing color to be used to create the corresponding print label L. It is sufficient for the print data to include at least one of: a character or a pattern or an image to be printed; the printing color to be used when printing; and a printing resolution (described later) to be used when printing.

<Attribute Specification Information>

Each set of print data is correlated with attribute specification information specifying the print label tape 110 and ink ribbon 106 to be used to create the corresponding print label L. The attribute specification information includes specifications for the tape width and tape color of the print label tape 110 to be used to create the corresponding print label L. The attribute specification information also includes a specification for the printing color of the ink ribbon 106 to be used to create the corresponding print label L. That is, each set of attribute specification information specifies the attributes of cartridge 110 (hereinafter, referred to as "cartridge attributes") to be used to create the corresponding print label L. As with the print data described above, this attribute specification information is generated on the operation terminal 2. In the present embodiment, specifications for three cartridge attributes: the tape width, the tape color, and the printing color are included in the attribute specification information as described above. However, the attribute specification information may further include specifications for the material composition of the cover film 104, base tape 102, and the like. Further, it is sufficient for the attribute specification information to include for at least one of specifications for the tape width, tape color, printing color, tape material (i.e., material composition), and the like.

<Suitability of Mounted Cartridge Type to Label Data>

Print data generated as described above for each of the top label LA, middle label LB, and bottom label LC is outputted to the label printers 3a-3c, and each label printer 3 individually creates an assigned one of the top label LA, middle label LB, and bottom label LC. Consequently, prior to outputting the print data described above, it is important to determine whether the type of cartridge 101 actually mounted in each label printer 3 is suitable for creating the corresponding top label LA, middle label LB, and bottom label LC.

As described above, the cartridge sensor 31 in each label printer 3 detects the type of the cartridge 101 mounted therein. Further, the types of cartridges 101 are pre-correlated with the types of the cover film 104, ink ribbon 106, base tape 102, and the like, i.e., the attributes of the cover film 104, ink ribbon 106, base tape 102, and the like. Hence, the attributes of the cover film 104, ink ribbon 106, base tape 102 and the like, i.e., the cartridge attributes such as the above-described tape width, tape color, printing color, tape material, and the like are detected by detecting the type of the cartridge 101 using the cartridge sensor 31. For convenience, the top label LA, middle label LB, and bottom label LC will be simply referred to as the "labels LA-LC" in the following description.

In order to determine the suitability described above, the operation terminal 2 in the present embodiment acquires cartridge type information corresponding to detection results by the cartridge sensors 31 of the label printers 3a-3c after generating label data for creating each of the labels LA-LC (i.e., after generating label data for creating the top label LA, label data for creating the middle label LB, and label data for creating the bottom label LC).

Each set of label data includes: print data for creating the corresponding print label L; and attribute specification information correlated with that print data. That is, the label data for the top label LA includes the print data for the top label LA and the attribute specification information correlated with that print data, the label data for the middle label LB includes the print data for the middle label LB and the attribute specification information correlated with that print data, and the label data for the bottom label LC includes the print data for the bottom label LC and the attribute specification information correlated with that print data.

The cartridge type information represents the types of cartridges 101 mounted in the cartridge holders 22 of the label printers 3a-3c. That is, the cartridge type information corresponding to the detection result by the cartridge sensor 31 of the label printer 3a represents the type of the cartridge 101 actually mounted in the label printer 3a, the cartridge type information corresponding to the detection result by the cartridge sensor 31 of the label printer 3b represents the type of the cartridge 101 actually mounted in the label printer 3b, and the cartridge type information corresponding to the detection result by the cartridge sensor 31 of the label printer 3c represents the type of the cartridge 101 actually mounted in the label printer 3c. Therefore, the cartridge type information includes the cartridge attributes such as the above-described tape width, tape color, printing color, tape material, and the like. This is because the types of cartridges 101 are pre-correlated with the cartridge attributes as described above. The cartridge type information is an example of the medium type information, and also is an example of the accommodation body type information. The tape width included in the cartridge type information is an example of the width of the printing medium. The tape color included in the cartridge type information is an example of the color of the printing medium. The tape material included in the cartridge type information is an example of the material of the printing medium. The cartridge attributes are an example of the printing medium attributes.

<Distribution and Transmission of Print Data>

Based on the label data for each of the labels LA-LC and the cartridge type information acquired from each of the label printers 3a-3c, the operation terminal 2 distributes and transmits the print data to the corresponding label printers 3a-3c that are suited to creating the labels LA-LC. Next, an example of this distribution and transmission will be described with reference to FIG. 5.

<Cartridge Type Information Acquired from Each Label Printer>

Figure 5:
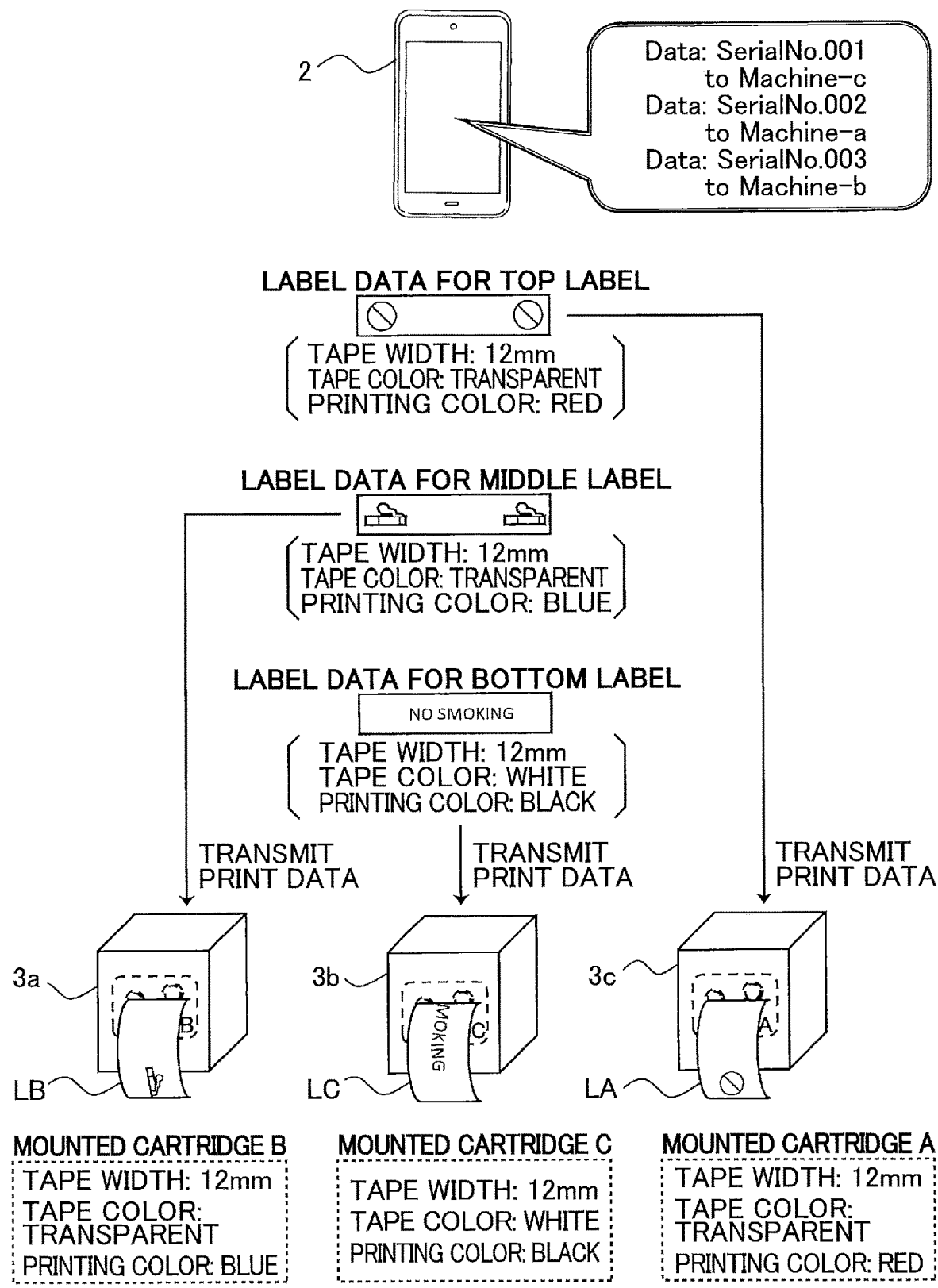
FIG. 5 is an explanatory view illustrating a manner in which print data is distributed and transmitted to the corresponding label printers suitable for creating print labels by a method according to the embodiment of the present disclosure.

In the example shown in FIG. 5, the cartridge type information that the operation terminal 2 acquires from the label printer 3a indicates that the cartridge 101 mounted in the label printer 3a has a 12-mm tape width, a transparent tape color, and a blue printing color. For convenience, this cartridge 101 will be called "cartridge B" in the following description. This notation will be used in all drawings.

The cartridge information that the operation terminal 2 acquires from the label printer 3b indicates that the cartridge 101 mounted in the label printer 3b has a 12-mm tape width, a white tape color, and a black printing color. For convenience, this cartridge 101 will be called "cartridge C" in the following description. Similarly, the cartridge type information that the operation terminal 2 acquires from the label printer 3c indicates that the cartridge 101 mounted in the label printer 3c has a 12-mm tape width, a transparent tape color, and a red printing color. For convenience, this cartridge 101 will be called "cartridge A" in the following description.

<Label Data Generated by the Operation Terminal>

In label data generated by the operation terminal 2 for the top label LA, the attribute specification information specifies a tape width of 12 mm, a transparent tape color, and a red printing color. The print data in the label data for the top label LA includes images of the prohibited marks M1 described above and specifies a red printing color for forming the prohibited marks M1 in red.

Similarly, the attribute specification information in the label data for the middle label LB specifies a tape width of 12 mm, a transparent tape color, and a blue printing color. Further, the print data in the label data for the middle label LB includes images of the cigarette icons M2 described above and specifies a blue printing color for forming the cigarette icons M2 in blue.

Similarly, the attribute specification information in the label data for the bottom label LC specifies a tape width of 12 mm, a white tape color, and a black printing color. Further, the print data in the label data for the bottom label LC includes the text T1 described above and specifies a black printing color for forming the text T1 in black.

<Setting Output Destinations for Print Data>

Based on the information in the example given above, the operation terminal 2 sets the label printer 3c as the output destination of the print data for the top label LA since the cartridge A mounted in the label printer 3c matches the cartridge attributes specified by the attribute specification information in the label data for the top label LA: "tape width: 12 mm," "tape color: transparent," and "printing color: red." When the operation terminal 2 transmits this print data to the label printer 3c, the label printer 3c creates the transparent print label tape 110 having the prohibited marks M1 formed therein in red and cuts off the created print label tape 110 to thereby create the top label LA.

Similarly, the operation terminal 2 sets the label printer 3a as the output destination of the print data for the middle label LB since the cartridge B mounted in the label printer 3a matches the cartridge attributes specified by the attribute specification information in the label data for the middle label LB: "tape width: 12 mm," "tape color: transparent," and printing color: blue." When the operation terminal 2 transmits this print data to the label printer 3a, the label printer 3a creates the transparent print label tape 110 having the cigarette icons M2 formed therein in blue and cuts off the created print label tape 110 to thereby create the middle label LB.

Similarly, the operation terminal 2 sets the label printer 3b as the output destination of the print data for the bottom label LC since the cartridge C mounted in the label printer 3b matches the cartridge attributes specified by the attribute specification information in the label data for the bottom label LC: "tape width: 12 mm," "tape color: white," and "printing color: black." When the operation terminal 2 transmits this print data to the label printer 3b, the label printer 3b creates the white print label tape 110 having the text T1 formed therein in black and cuts off the created print label tape 110 to thereby create the bottom label LC.

In the relationship between the top label LA and the middle label LB, the top label LA is an example of the first print label and the middle label LB is an example of the second print label; the label data for the top label LA is an example of the first label data and the label data for the middle label LB is an example of the second label data; the print data included in the label data for the top label LA is an example of the first print data and the print data included in the label data for the middle label LB is an example of the second print data; the attribute specification information included in the label data for the top label LA is an example of the first attribute specification information and the attribute specification information included in the label data for the middle label LB is an example of the second attribute specification information; the label printer 3c is an example of the first printing device and the label printer 3a is an example of the second printing device; and the cartridge type information acquired from the label printer 3c is an example of the first medium type information and the cartridge type information acquired from the label printer 3a is an example of the second medium type information.

In the relationship between the middle label LB and the bottom label LC, the middle label LB is an example of the first print label and the bottom label LC is an example of the second print label; the label data for the middle label LB is an example of the first label data and the label data for the bottom label LC is an example of the second label data; the print data included in the label data for the middle label LB is an example of the first print data and the print data included in the label data for the bottom label LC is an example of the second print data; the attribute specification information included in the label data for the middle label LB is an example of the first attribute specification information and the attribute specification information included in the label data for the bottom label LC is an example of the second attribute specification information; the label printer 3a is an example of the first printing device and the label printer 3b is an example of the second printing device; and the cartridge type information acquired from the label printer 3a is an example of the first medium type information and the cartridge type information acquired from the label printer 3b is an example of the second medium type information.

In the relationship between the top label LA and the bottom label LC, the top label LA is an example of the first print label and the bottom label LC is an example of the second print label; the label data for the top label LA is an example of the first label data and the label data for the bottom label LC is an example of the second label data; the print data included in the label data for the top label LA is an example of the first print data and the print data included in the label data for the bottom label LC is an example of the second print data; the attribute specification information included in the label data for the top label LA is an example of the first attribute specification information and the attribute specification information included in the label data for the bottom label LC is an example of the second attribute specification information; the label printer 3c is an example of the first printing device and the label printer 3b is an example of the second printing device; and the cartridge type information acquired from the label printer 3c is an example of the first medium type information and the cartridge type information acquired from the label printer 3b is an example of the second medium type information.

<Control Procedure>

An example of the control procedure executed by the CPU 11 of the operation terminal 2 to implement the method described above will be described with reference to the flowchart in FIG. 6. The CPU 11 executes this control procedure based on the printing process program included in the programs stored in the ROM 12b. By executing this printing process program, the CPU 11 implements the printing method described below according to the present embodiment. The Rom 12b storing therein the printing process program is an example of the In S5 the CPU 11 receives, via the operating unit 13, editing operations for creating the printing content of the top label LA, middle label LB, and bottom label LC described above. Based on these editing operations, the CPU 11 generates label data for each of the top label LA, middle label LB, and bottom label LC.

In S10 the CPU 11 identifies, on the basis of the label data generated in S5, the attribute specification information included in the label data for each of the labels LA-LC. In other words, the CPU 11 identifies the cartridge attributes, such as the tape width, tape color, printing color, and the like, that are specified for each of the labels LA-LC. In the present embodiment, in S10 the CPU 11 identifies, for each of the labels LA-LC, the tape width, tape color, and printing color specified by the attribute specification information included in the corresponding label data generated in S5.

According to the above example, the specified cartridge attributes are identified as a tape width of 12 mm, a transparent tape color, and a red printing color from the label data for the top label LA; the specified cartridge attributes are identified as a tape width of 12 mm, a transparent tape color, and a blue printing color from the label data for the middle label LB; and the specified cartridge attributes are identified as a tape width of 12 mm, a white tape color, and a black printing color from the label data for the bottom label LC.

In S15 the CPU 11 sets a search condition to search for the label printers 3 that suited to creating the label LA-LC. The search condition is that the cartridge type information acquired from the label printer 3 meets a matching condition in relation to any of the sets of attribute specification information identified in S10. That is, the search condition is met when the matching condition is met between the cartridge type information acquired from the label printer 3 and any of the sets of attribute specification information identified in S10. The matching condition is that the cartridge attributes indicated by the cartridge type information perfectly match the cartridge attributes specified by the attribute specification information.

In S15 the CPU 11 sets a search range in which to search for label printers 3 that meet the search condition set above. Initially, in S15 the CPU 11 sets the search range to all label printers 3 that can communicate with the operation terminal 2, for example. Alternatively, the CPU 11 may set the initial search range to limit these label printers 3 that can communicate with the operation terminal 2 to products of a specific manufacturer.

In S20 the CPU 11 searches the search range set in S15 for a label printer 3 through the communication control unit 15. In S25 the CPU 11 determines whether a label printer 3 that falls within the search range has been found. The CPU 11 advances to S30 if a label printer 3 that falls within the search range has been found (S25: YES). On the other hand, the CPU 11 returns to S20 if no label printer 3 that falls within the search range has been found (S25: NO). That is, the CPU 11 repeats steps S20 and S25 until a label printer 3 that falls within the search range is found or until a predetermined period of time elapses (i.e., a timeout occurs). Note that, when the predetermined period of time has elapsed while the CPU 11 is repeating steps S20 and S25, the CPU 11 ends the process illustrated in FIG. 6.

In S30 the CPU 11 acquires the cartridge type information and printer information from the label printer 3 found in S20 via the communication control unit 15. That is, the CPU 21c of the label printer 3 transmits the cartridge type information indicating the type of cartridge 101 mounted in the cartridge holder 22, and the printer information to the operation terminal 2 via the communication control unit 23.

The cartridge type information indicates the type of cartridge 101 mounted in the label printer 3. The CPU 11 can acquire the cartridge attributes of that label printer 3, i.e., the above-described tape width, tape color, printing color, and the like through the correlations between the type of cartridge 101 and the types of cover films 104, ink ribbons 106, and the like.

The printer information includes model name information and the serial number of the label printer 3, the capacity of the print head 29, and the like. The capacity of the print head 29 may include printing resolution. Alternatively, the printer information need not be acquired in S30 together with the cartridge type information. That is, the CPU 11 may acquire just the cartridge type information in S30. In this case, printer information may be correlated in some other form with the acquired cartridge type information, and the CPU 11 may use this correlation to acquire the printer information at a suitable timing. The model name information included in the printer information is an example of the device identification information. Also, the serial number included in the printer information is an example of the device identification information.

In S35 the CPU 11 determines whether the label printer 3 found in S20 meets the search condition. That is, the CPU 11 determines that the label printer 3 found in S20 meets the search condition when the matching condition is met between the cartridge type information acquired in S30 and any of the sets of attribute specification information identified in S10. On the other hand, the CPU 11 determines that the label printer 3 found in S20 does not meet the search condition when the matching condition is not met between the cartridge type information acquired in S30 and any of the sets of attribute specification information identified in S10, i.e., when the cartridge type information acquired in S30 does not meet the matching condition in relation to all of the sets of attribute specification information identified in S10.

In the present embodiment, in order to determine whether the label printer 3 found in S20 meets the search condition, the CPU 11 determines whether the cartridge type information acquired in S30 meets the matching condition in relation to any of: the attribute specification information included in the label data for the top label LA; the attribute specification information included in the label data for the middle label LB; and the attribute specification information included in the label data for the bottom label LC. More specifically, the CPU 11 determines whether the tape width, tape color, and printing color indicated by the cartridge type information acquired in S30 perfectly match any of the following (1), (2), and (3) identified in S10: (1) "tape width: 12 mm, tape color: transparent, and printing color: red" specified by the attribute specification information in the label data for the top label LA; (2) "tape width: 12 mm, tape color: transparent, and printing color: blue" specified by the attribute specification information in the label data for the middle label LB; and (3) "tape width: 12 mm, tape color: white, and printing color: black" specified by the attribute specification information in the label data for the bottom label LC.

For example, in a case where the tape width, tape color, and printing color indicated by the cartridge type information acquired in S30 perfectly match (3) "tape width: 12 mm, tape color: white, and printing color: black" specified by the attribute specification information in the label data for the bottom label LC, the CPU 11 determines that the matching condition is met between the cartridge type information acquired in S30 and the attribute specification information included in the label data for the bottom label LC. Further, in this case, the CPU 11 determines that the label printer 3 found in S20 meets the search condition.

Note that rather than a perfect match as described above, the matching condition may allow slight discrepancies or deviations in size for at least one of the tape width, tape color, and printing color.

If the label printer 3 found in S20 does not meet the search condition, i.e., the cartridge type information acquired in S30 does not meet the matching condition in relation to any of the sets of attribute specification information identified in S10 (S35: NO), the CPU 11 returns to S20. However, if the label printer 3 found in S20 meets the search condition, i.e., the matching condition is met between the cartridge type information acquired in S30 and any of the sets of attribute specification information identified in S10 (S35: YES), the CPU 11 sets the label printer 3 found in S20 as the output destination for the print data included in the label data including the attribute specification information that has been determined in S35 to perfectly match the cartridge type information acquired in S30. Thereafter, the CPU 11 advances to S40. For example, in a case where the CPU 11 determines in S35 that the tape width, tape color, and printing color indicated by the acquired cartridge type information perfectly match (3) "tape width: 12 mm, tape color: white, and printing color: black" specified by the attribute specification information in the label data for the bottom label LC, the CPU 11 sets the label printer 3 found in S20 as the output destination for the print data included in the label data for the bottom label LC.

In S40 the CPU 11 stores the cartridge type information and printer information acquired in S30 in a suitable location, such as the high-capacity storage device 16 described above.

In S45 the CPU 11 transmits, to the label printer 3 set as the output destination in S35, the print data included in the label data containing the attribute specification information that the cartridge type information acquired in S30 has been determined in S35 to perfectly match. The CPU 21c of the label printer 3 receives this print data via the communication control unit 23.

In the example described above, the CPU 11 transmits the print data for the top label LA to the label printer 3c in which the cartridge A matching the cartridge attributes of a 12-mm tape width, a transparent tape color, and a red printing color specified in the label data for the top label LA is being mounted. Alternatively, the CPU 11 transmits the print data for the middle label LB to the label printer 3a in which the cartridge B matching the cartridge attributes of a 12-mm tape width, a transparent tape color, and a blue printing color specified in the label data for the middle label LB is being mounted. Alternatively, the CPU 11 transmits the print data for the bottom label LC to the label printer 3b in which the cartridge C matching the cartridge attributes of a 12-mm tape width, a white tape color, and a black printing color specified in the label data for the bottom label LC is being mounted. Through this process, creation of the top label LA, middle label LB, and bottom label LC are assigned to the label printers 3a, 3b, and 3c by the operation terminal 2 according to their own cartridge type information transmitted in S30, and each of the label printers 3a, 3b, and 3c creates an assigned one of the top label LA, middle label LB, and bottom label LC constituting the composite label LL.

In S50 the CPU 11 displays, on the display unit 14, identification information, such as model name information or a serial number, for each label printer 3 to which print data has been transmitted in S45 based on the printer information stored in S40. In other words, in S50 the CPU 11 displays, on the display unit 14, the identification information for each label printer 3 determined as the output destination for the print data in S35. In addition to the identification information, in S50 the CPU 11 displays, on the display unit 14, a serial number or the like for each print data transmitted in S45. Here, identification information is displayed cumulatively each time a YES determination is made in S35. Thus, each time one of the labels LA-LC is printed in sequence by the corresponding label printers 3a-3c, the label printer 3 that executes the print is added to the display on the display unit 14.

FIG. 5 described above shows the display state on the display unit 14 of the operation terminal 2 after all print data for the labels LA, LB, and LC has been transmitted. As shown in the drawing, information displayed on the display unit 14 indicates that print data for the top label LA having the serial number "001" has been transmitted to the label printer 3c identified by "Machine-c." Similarly, information displayed on the display unit 14 indicates that print data for the middle label LB having the serial number "002" has been transmitted to the label printer 3a identified by "Machine-a" and that print data for the bottom label LC having serial number "003" has been transmitted to the label printer 3b identified by "Machine-b." By displaying all label printers 3 to which print data has been transmitted on the display unit 14 in this way, the user can easily recognize what label printers 3 have executed a print.

Returning to FIG. 6, in S55 the CPU 11 updates the search condition described above. More specifically, the CPU 11 excludes, from the search condition, the attribute specification information included in the label data containing the print data transmitted in S45. For example, in a case where the print data included in the label data for the top label LA has been transmitted in S45, in the next and subsequent determinations in S35 whether a found label printer 3 meets the search condition, the CPU 11 does not perform a determination whether the matching condition is met between the cartridge type information and the attribute specification information included in the label data for the top label LA.

In S55 the CPU 11 also updates the search range described above. More specifically, the CPU 11 excludes, from the search range (search targets), the label printer 3 determined in S35 to meet the search condition (i.e., the label printer 3 whose cartridge attributes have been determined in S35 to perfectly match the specified tape widths, tape colors, and printing colors generated in S5 and identified in S10 and to which print data has been transmitted in S45). Subsequently, the CPU 11 advances to S60.

In S60 the CPU 11 determines whether all print data generated in S5 has been transmitted. In this example, the CPU 11 determines whether the print data for the top label LA, print data for the middle label LB, and print data for the bottom label LC have all been transmitted. If all the print data has been transmitted (S60: YES), the CPU 11 ends the process in FIG. 6. When there remains print data that has not yet been transmitted (S60: NO), the CPU 11 advances to S65.

In S65 the CPU 11 displays the search condition updated in S55 on the display unit 14. In other words, the CPU 11 displays the specified cartridge attributes (i.e., the specified tape widths, tape colors, and printing colors) generated in S5 and identified in S10 that are used in the next and subsequent determinations in S35. At this time, examples of label printers 3 that meet the updated search condition (i.e., meets the displayed cartridge attributes) are displayed together with their identification information and the like described above. In this way, the user can clearly see what types of label printers 3 the operation terminal 2 is searching for. From this display, the user can ready the applicable label printers 3 and cartridges 101. Following the process in S65, the CPU 11 returns to S20 described above.

Figure 6:
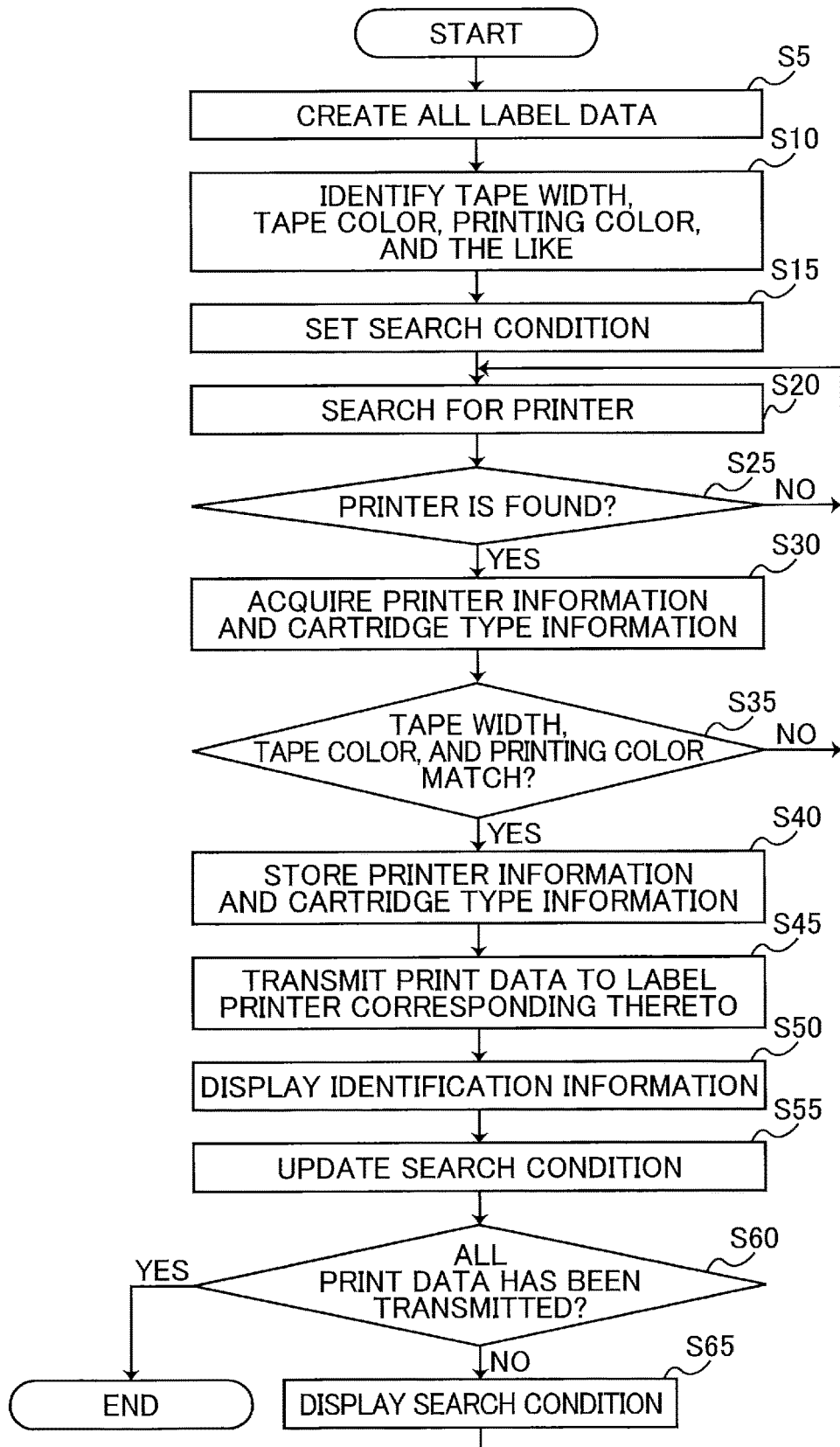
FIG. 6 is a flowchart illustrating a control procedure executed by a CPU of the terminal device according to the embodiment.

According to the steps shown in the flowchart of FIG. 6, the CPU 11 generates print data for each of the top label LA, middle label LB, and bottom label LC. Thereafter, each time a label printer 3 suitable for any one of the sets of print data is found, the CPU 11 transmits the corresponding print data to the label printer 3. In other words, each time one output destination for one of the sets of print data is determined in S35, the one of the sets of print data is transmitted in S45 to the determined output destination.

Effects of the Embodiment

In the present embodiment described above, the CPU 11 sets the output destination of print data for each print label L in S35 of the flowchart in FIG. 6 based on the cartridge type information for cartridges 101 mounted in the label printers 3 and the label data generated in S5. In this way, for each set of print data, the CPU 11 sets the output destination of the print data to a label printer 3 whose cartridge type information is suitable for the attribute specification information included in the label data, i.e., a label printer 3 whose mounted cartridge 101 possesses a cover film 104, ink ribbon 106, and base tape 102 compatible with the print label L to be created. In S45 the CPU 11 then outputs each set of print data to the corresponding label printer 3 set as the output destination.

According to the present embodiment described above, each set of print data for creating one of the print labels L can be reliably outputted to a label printer 3 having a cover film 104, ink ribbon 106, base tape 102, and the like suitable for that print data. Thus, a plurality of print labels L in desired forms to be used in an overlaid state can be created reliably and quickly.

As a particular feature of the embodiment, in S35 the CPU 11 sets a label printer 3 as the output destination when the matching condition is met between the cartridge type information for the label printer 3 and the attribute specification information included in the label data. Accordingly, each set of print data can be more reliably outputted to a label printer 3 in which a suitable cartridge 101 is mounted.

As shown in the flowchart of FIG. 6, another feature of the present embodiment is that each time the output destination is set for print data related to one print label L, the print data is outputted to the label printer 3 set as the output destination. In other words, each set of print data is outputted in S45 while confirming in S35 that there is a label printer 3 suitable as the output destination.

This method is suitable for cases in which the types of cartridges 101 mounted in label printers 3 located nearby are unknown or cases in which it is unclear whether the mounted cartridges 101 are suitable for the forms of the print labels L to be created. In such cases, a plurality of print labels L can be created more quickly and more reliably than when using a method of outputting print data for all of the print labels L after setting output destinations for the print data. The latter method will be described later in a variation with reference to FIG. 11.

Another feature of the present embodiment is that cartridges 101 capable of supplying the cover films 104, base tapes 102, ink ribbons 106, and the like are detachably mountable in cartridge holders 22, and cartridge type information representing the types of the cartridges 101 is used as medium type information. Thus, in S35 the CPU 11 sets a label printer 3 as the output destination for print data based on the label data described above and the cartridge type information associated with the type of the cartridge 101 mounted in each label printer 3. As a result, the CPU 11 can set the output destination of the label data (more specifically, the print data) to a label printer 3 possessing a cartridge 101 that is compatible with the print label L to be created.

Another feature of the present embodiment is the process in S50 executed in the flowchart of FIG. 6. In this process, on the display unit 14 of the operation terminal 2, the CPU 11 displays: the identification information such as the model name information, the serial number, and the like of each label printer 3 which has been set as the output destination for the print data and to which that print data has been transmitted; and the serial number or the like of the transmitted print data. In this way, the user can easily identify the label printers 3 to which the print data has been outputted.

While the specific embodiment of the present disclosure has been described in detail, it would be apparent to those skilled in the art that many modifications and variations may be made therein. Below, some of these variations will be described in detail, wherein like parts and components are designated with the same reference numerals to avoid duplicating description.

(1) Cases in which Label Printers that do not Meet Search Condition are Present

As a result of confirming in S35 whether the acquired sets of cartridge type information meet the matching condition in relation to the sets of attribute specification information, the matching condition may not be satisfied for some of the sets of attribute specification information. In such cases, the operation terminal 2 cannot set the output destination for the print data included in the label data including the attribute specification information for which the matching condition is not met. Here, a variation designed to handle such situations will be described with reference to FIG. 7, which corresponds to FIG. 5 in the above-described embodiment.

Figure 7:
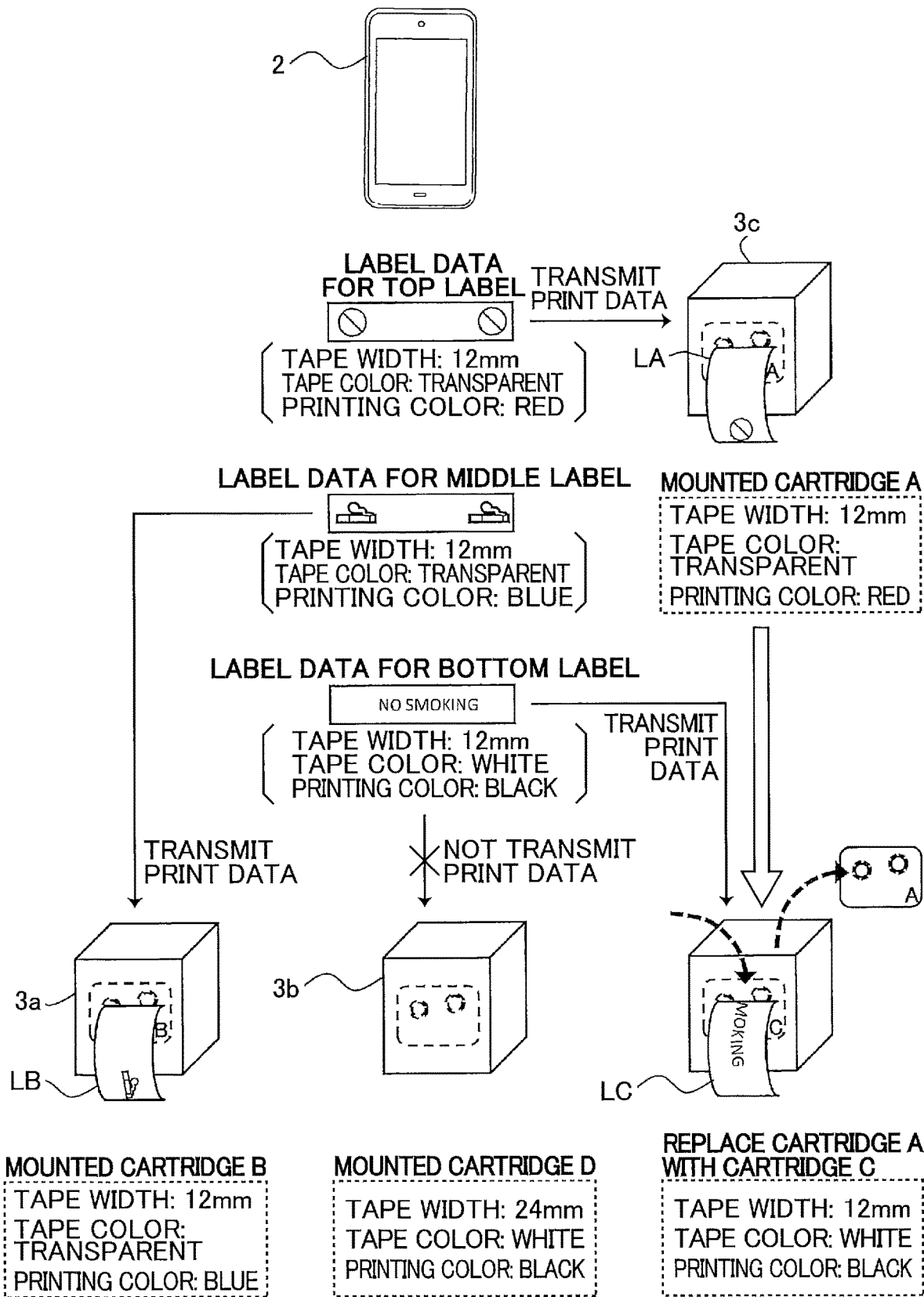
FIG. 7 is an explanatory view illustrating a manner in which print data is distributed and transmitted to the corresponding label printers suitable for creating print labels in a variation suited to a case in which output destination for some print data cannot be set.

In the example shown in FIG. 7, cartridge B having a 12-mm tape width, a transparent tape color, and a blue printing color is mounted in the label printer 3a, and cartridge A having a 12-mm tape width, a transparent tape color, and a red printing color is mounted in the label printer 3c, just as in the example of FIG. 5. Therefore, the label printer 3a is compatible with the print data included in the label data for the middle label LB, which contains the attribute specification information specifies a tape width of 12 mm, a transparent tape color, and a blue printing color. Further, the label printer 3c is compatible with the print data included in the label data for the top label LA, whose attribute specification information specifies a 12-mm tape width, a transparent tape color, and a red printing color.

However, cartridge D having a 24-mm tape width, a transparent tape color, and a black printing color is mounted in the label printer 3b. Consequently, the label printer 3b is not suitable for any of: the attribute specification information specifying a 12-mm tape width, a transparent tape color, and a blue printing color for the middle label LB; the attribute specification information specifying a 12-mm tape width, a transparent tape color, and a red printing color for the top label LA; and the attribute specification information specifying a 12-mm tape width, a white tape color, and a black printing color for the bottom label LC. Therefore, the CPU 11 cannot set the output destination of the print data for the bottom label LC unlike the above-described embodiment, because the bottom label LC requires a 12-mm tape width, a white tape color, and a black printing color.

In this case, according to this variation, the operation terminal 2 does not transmit any of the print data for the top label LA, middle label LB, or bottom label LC to the label printer 3b. Instead, the operation terminal 2 transmits the print data for the remaining bottom label LC to one of the remaining label printers 3a and 3c, and specifically the label printer 3c in the example of FIG. 7, under the assumption that the user will replace cartridge A in the label printer 3c with cartridge C.

Hence, the label printer 3c first receives the print data included in the label data for the top label LA in a state where cartridge A is mounted in the label printer 3c and creates the corresponding top label LA. Then, the label printer 3c displays on its display unit a message prompting the user to replace cartridge A with cartridge C. Subsequently, the user removes cartridge A and mounts cartridge C in the label printer 3c. The label printer 3c receives the print data included in the label data for the bottom label LC from the operation terminal 2 and creates the corresponding bottom label LC in a state where cartridge C is mounted in the label printer 3c.

In the relationship between the top label LA and the bottom label LC in the above variation, the top label LA is an example of the first print label and the bottom label LC is an example of the second print label; the label data for the top label LA is an example of the first label data and the label data for the bottom label LC is an example of the second label data; the print data included in the label data for the top label LA is an example of the first print data and the print data included in the label data for the bottom label LC is an example of the second print data; the attribute specification information included in the label data for the top label LA is an example of the first attribute specification information and the attribute specification information included in the label data for the bottom label LC is an example of the second attribute specification information; the label printer 3c is an example of the first printing device and the label printer 3b is an example of the second printing device; and the cartridge type information acquired from the label printer 3c is an example of the first medium type information and the cartridge type information acquired from the label printer 3b is an example of the second medium type information.

<Effects of Variation (1)>

As described above, an exception may occur in which the output destination cannot be determined for the print data included in the label data for the bottom label LC. As a remedy for this exception, the CPU 11 of the variation sets the output destination of the print data for the bottom label LC to the label printer 3c whose cartridge type information meets the matching condition in relation to the attribute specification information for the top label LA. In other words, the label printer 3c is set as the output destination for both the print data for the top label LA and the print data for the bottom label LC. As a result, the top label LA and the bottom label LC can be created on the label printer 3c using the respective print data for the top label LA and print data for the bottom label LC while the user exchanges cartridge A with cartridge C.

(2) Cases in which Output Destinations are Set with Consideration for Printing Resolution This variation will be described with reference to FIGS. 8 through 10 corresponding to FIG. 5 of the above-described embodiment.

<Outputting to Label Printers having a Common Printing Resolution>

Figure 8:
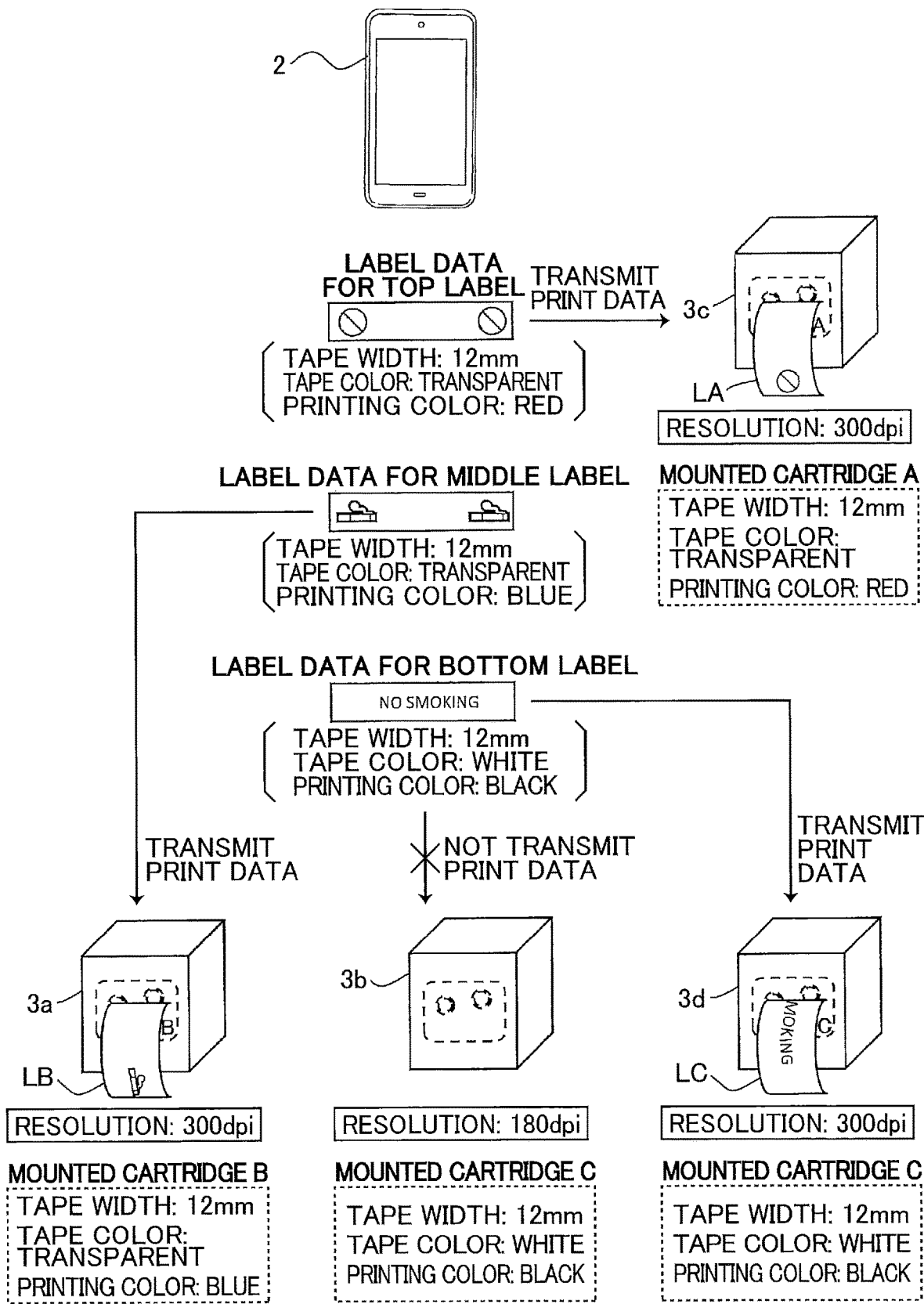
FIG. 8 is an explanatory view illustrating an example of a manner in which print data is distributed and transmitted to the corresponding label printers suitable for creating print labels in a variation of setting output destinations with consideration for printing resolutions.

In the example shown in FIG. 8, the cartridge mounted in the label printer 3a is cartridge B, which has a 12-mm tape width, a transparent tape color, and a blue printing color, just as in the example of FIG. 5. Further, cartridge C having a 12-mm tape width, a white tape color, and a black printing color is mounted in the label printer 3b, and cartridge A having a 12-mm tape width, a transparent tape color, and a red printing color is mounted in the label printer 3c.

Therefore, the label printer 3a is compatible with the print data included in the label data for the middle label LB, whose attribute specification information specifies a 12-mm tape width, a transparent tape color, and a blue printing color. Similarly, the label printer 3b is compatible with the print data included in the label data for the bottom label LC, whose attribute specification information specifies a 12-mm tape width, a white tape color, and a black printing color. Further, the label printer 3c is compatible with the print data included in the label data for the top label LA, whose attribute specification information specifies a 12-mm tape width, a transparent tape color, and a red printing color.

In the variation shown in FIG. 8, the printer information including printing resolution information for the print head 29 is transmitted from each label printer 3 to the operation terminal 2 in addition to the tape width, tape color, and printing color. In this example, the printing resolution information for the print head 29 in both the label printer 3a and label printer 3c is 300 dpi, while the printing resolution information for the print head 29 in the label printer 3b is 180 dpi. Hence, the printing resolution of the label printer 3b differs from the printing resolutions of the label printers 3a and 3c. Here, the print data for the middle label LB and top label LA are respectively transmitted to the label printer 3a and label printer 3c, as in the present embodiment. However, if the print data for the bottom label LC were transmitted to the label printer 3b as in the present embodiment, the bottom label LC would be formed with a different printing quality from that of the top label LA and middle label LB.

Here, in the variation shown in FIG. 8, a label printer 3d is provided in addition to the label printers 3a-3c. The label printer 3d also transmits its cartridge type information and printer information to the operation terminal 2. The cartridge type information indicates that the cartridge 101 mounted in the label printer 3d has a 12-mm tape width, a white tape color, and a black printing color. The printer information includes printing resolution information indicating that the print head 29 in the label printer 3d has a resolution of 300 dpi. In this way, the operation terminal 2 acquires both the printer information and the cartridge type information from the label printer 3d.

The label printer 3d is compatible with the print data included in the label data for the bottom label LC, whose attribute specification information specifies a 12-mm tape width, a white tape color, and a black printing color. Further, the 300-dpi resolution of the label printer 3d is equivalent to the resolutions of the label printers 3a and 3c.

In this case, the operation terminal 2 transmits the print data for the bottom label LC to the label printer 3d having an equivalent resolution of 300 dpi rather than transmitting the print data to the label printer 3b having a resolution of 180 dpi, which differs from the resolutions of the label printers 3a and 3c. Note that the printing resolution of the label printer 3d need not be perfectly equivalent to the resolutions of the label printers 3a and 3c, but may differ slightly, provided that the resolution is substantially equivalent. Hereinafter, printing resolutions that are perfectly equivalent and substantially equivalent will be called "approximately equivalent." The label printers 3a, 3c, 3d in this variation are an example of the specific printing devices.

In the relationship between the top label LA and the middle label LB in this variation, the top label LA is an example of the first print label and the middle label LB is an example of the second print label; the label data for the top label LA is an example of the first label data and the label data for the middle label LB is an example of the second label data; the print data included in the label data for the top label LA is an example of the first print data and the print data included in the label data for the middle label LB is an example of the second print data; the attribute specification information included in the label data for the top label LA is an example of the first attribute specification information and the attribute specification information included in the label data for the middle label LB is an example of the second attribute specification information; the label printer 3c is an example of the first printing device and the label printer 3a is an example of the second printing device; and the cartridge type information acquired from the label printer 3c is an example of the first medium type information and the cartridge type information acquired from the label printer 3a is an example of the second medium type information.

In the relationship between the middle label LB and the bottom label LC in this variation, the middle label LB is an example of the first print label and the bottom label LC is an example of the second print label; the label data for the middle label LB is an example of the first label data and the label data for the bottom label LC is an example of the second label data; the print data included in the label data for the middle label LB is an example of the first print data and the print data included in the label data for the bottom label LC is an example of the second print data; the attribute specification information included in the label data for the middle label LB is an example of the first attribute specification information and the attribute specification information included in the label data for the bottom label LC is an example of the second attribute specification information; the label printer 3a is an example of the first printing device and the label printer 3d is an example of the second printing device; and the cartridge type information acquired from the label printer 3a is an example of the first medium type information and the cartridge type information acquired from the label printer 3d is an example of the second medium type information.

In the relationship between the top label LA and the bottom label LC in this variation, the top label LA is an example of the first print label and the bottom label LC is an example of the second print label; the label data for the top label LA is an example of the first label data and the label data for the bottom label LC is an example of the second label data; the print data included in the label data for the top label LA is an example of the first print data and the print data included in the label data for the bottom label LC is an example of the second print data; the attribute specification information included in the label data for the top label LA is an example of the first attribute specification information and the attribute specification information included in the label data for the bottom label LC is an example of the second attribute specification information; the label printer 3c is an example of the first printing device and the label printer 3d is an example of the second printing device; and the cartridge type information acquired from the label printer 3c is an example of the first medium type information and the cartridge type information acquired from the label printer 3d is an example of the second medium type information.

<Outputting after Obtaining Permission to Use Different Printing Resolutions>

In the example shown in FIG. 9, the cartridge mounted in the label printer 3a is cartridge B, which has a tape width of 12 mm, a transparent tape color, and a blue printing color, and the print head 29 has a resolution of 300 dpi, as in the example of FIG. 8. Further, the cartridge mounted in the label printer 3c is cartridge A, which has a 12-mm tape width, a transparent tape color, and a red printing color, and the print head 29 has a resolution of 300 dpi. Further, the cartridge mounted in the label printer 3b is cartridge C, which has a 12-mm tape width, a white tape color, and a black printing color, and the print head 29 has a resolution of 180 dpi.

In this variation, the number of label printers 3 whose printing resolutions are approximately equivalent is two (i.e., the label printers 3a and 3c), while the number of print labels L to be created is three. Hence, if the operation terminal 2 followed the above-described rule of transmitting print data only to label printers 3 having approximately equivalent printing resolutions, an output destination could not be set for at least one set of print data (one set in this example). In other words, the number of label printers 3 having approximately equivalent printing resolutions is insufficient for the number of the sets of label data. Specifically, the number of label printers 3 having approximately equivalent printing resolutions is lacking by one. The label printers 3a and 3c in this variation are an example of the specific printing devices already determined as the output destinations.

Therefore, in a case where an output destination cannot be set for print data assuming that the operation terminal 2 follows the above-described role, the operation terminal 2 according to this variation sets the output destination for the print data to a label printer 3 whose printing resolution differs greatly from the values of the approximately equivalent printing resolutions. Thus, in this example, the operation terminal 2 sets the output destination of the print data for the bottom label LC to the label printer 3b. Note that the standard for determining whether printing resolutions "differ greatly" may be whether the absolute value of the deviation of printing resolution is greater than a predetermined threshold value, such as 30 dpi. The deviation of the printing resolution of a label printer 3 targeted for the above determination is calculated by subtracting, from the printing resolution of the targeted label printer 3, the average value of a group consisting of the printing resolutions of the targeted label printer 3 and the printing resolutions of the label printers 3 already set as the output destinations. In this example shown in FIG. 9, the deviation of the printing resolution of the label printer 3b targeted for the above determination is calculated by subtracting the average value of the printing resolutions of the label printers 3a-3c from the printing resolution of the label printer 3c.

In this example, the operation terminal 2 displays, on the display unit 14, a message indicating that the printing quality of the bottom label LC will be lower when created on the label printer 3b since the label printer 3b has a different printing resolution from the label printers 3a and 3c and an inquiry as to whether to permit use of the label printer 3b whose printing resolution is different from the printing resolutions of the label printers 3a and 3c. When the user performs an input operation to indicate permission to use the label printer 3b and the operation terminal 2 acquires this input, the operation terminal 2 transmits the print data for the bottom label LC to the label printer 3b.

In the relationship between the top label LA and the middle label LB in this variation, the top label LA is an example of the first print label and the middle label LB is an example of the second print label; the label data for the top label LA is an example of the first label data and the label data for the middle label LB is an example of the second label data; the print data included in the label data for the top label LA is an example of the first print data and the print data included in the label data for the middle label LB is an example of the second print data; the attribute specification information included in the label data for the top label LA is an example of the first attribute specification information and the attribute specification information included in the label data for the middle label LB is an example of the second attribute specification information; the label printer 3c is an example of the first printing device and the label printer 3a is an example of the second printing device; and the cartridge type information acquired from the label printer 3c is an example of the first medium type information and the cartridge type information acquired from the label printer 3a is an example of the second medium type information.

In the relationship between the middle label LB and the bottom label LC in this variation, the middle label LB is an example of the first print label and the bottom label LC is an example of the second print label; the label data for the middle label LB is an example of the first label data and the label data for the bottom label LC is an example of the second label data; the print data included in the label data for the middle label LB is an example of the first print data and the print data included in the label data for the bottom label LC is an example of the second print data; the attribute specification information included in the label data for the middle label LB is an example of the first attribute specification information and the attribute specification information included in the label data for the bottom label LC is an example of the second attribute specification information; the label printer 3a is an example of the first printing device and the label printer 3b is an example of the second printing device; and the cartridge type information acquired from the label printer 3a is an example of the first medium type information and the cartridge type information acquired from the label printer 3b is an example of the second medium type information.

In the relationship between the top label LA and the bottom label LC in this variation, the top label LA is an example of the first print label and the bottom label LC is an example of the second print label; the label data for the top label LA is an example of the first label data and the label data for the bottom label LC is an example of the second label data; the print data included in the label data for the top label LA is an example of the first print data and the print data included in the label data for the bottom label LC is an example of the second print data; the attribute specification information included in the label data for the top label LA is an example of the first attribute specification information and the attribute specification information included in the label data for the bottom label LC is an example of the second attribute specification information; the label printer 3c is an example of the first printing device and the label printer 3b is an example of the second printing device; and the cartridge type information acquired from the label printer 3c is an example of the first medium type information and the cartridge type information acquired from the label printer 3b is an example of the second medium type information.

<Printing while Replacing a Cartridge on One Label Printer>

Figure 10:
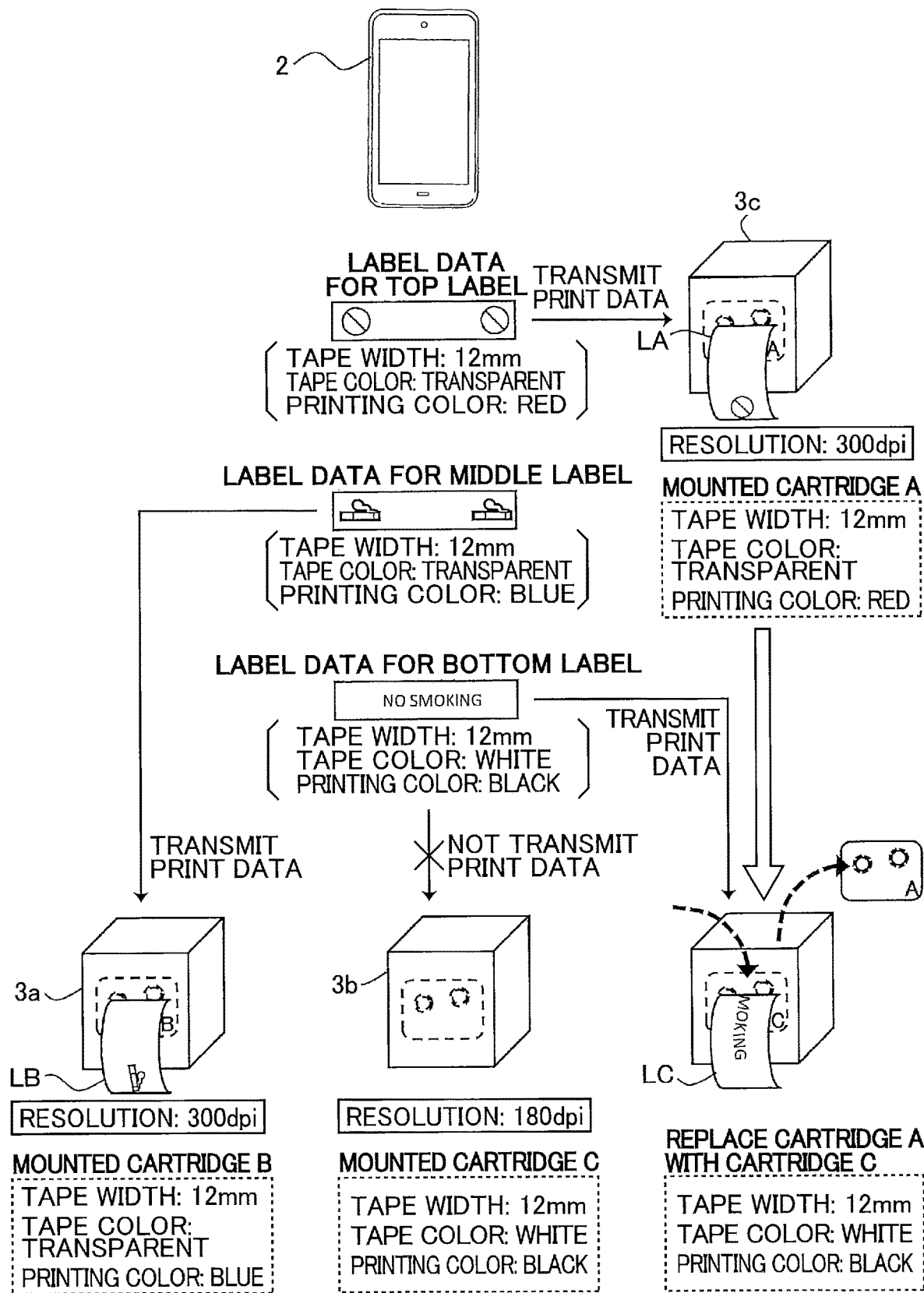
FIG. 10 is an explanatory view illustrating still another example of the manner in which print data is distributed and transmitted to the corresponding label printers suitable for creating print labels in the variation of setting output destinations with consideration for printing resolutions.

In the example of FIG. 10, the label printer 3a is compatible with the tape width, tape color, and printing color specified by the attribute specification information included in the label data for the middle label LB, as in the example of FIG. 8. Further, the label printer 3c is compatible with the tape width, tape color and printing color specified by the attribute specification information included in the label data for the top label LA. Further, the label printer 3b is compatible with the tape width, tape color, and printing color specified by the attribute specification information included in the label data for the bottom label LC. As in FIG. 8, the printing resolution of the label printer 3b is 180 dpi, while the printing resolutions of the label printers 3a and 3c are 300 dpi.

Unlike the example in FIG. 8, the label printer 3d is not provided in the example shown in FIG. 10. Hence, since the operation terminal 2 cannot output the print data for the bottom label LC to the label printer 3b because the resolution of the label printer 3b differs from that of the other label printers 3a and 3c, the operation terminal 2 cannot set an output destination for the print data for the bottom label LC.

Consequently, the operation terminal 2 in this variation does not transmit any print data for the top label LA, middle label LB, or bottom label LC to the label printer 3b, as in the variation (1) described above. Here, the print data for the remaining bottom label LC is transmitted from the operation terminal 2 to one of the other label printers 3a and 3c under the assumption that the user will replace one of cartridge B in the label printer 3a and cartridge A in the label printer 3c with cartridge C. In this variation, the print data for the bottom label LC is transmitted from the operation terminal 2 to the label printer 3c under the assumption that the user will replace cartridge A in the label printer 3c with cartridge C.

Specifically, the label printer 3c first receives the print data included in the label data for the top label LA in a state where cartridge A is mounted therein and creates the corresponding top label LA at a 300-dpi printing resolution. Thereafter, the user removes cartridge A and mounts cartridge C in the label printer 3c. The label printer 3c then receives the print data included in the label data for the bottom label LC from the operation terminal 2 in a state where cartridge C is mounted therein and creates the corresponding bottom label LC at a 300-dpi printing resolution.

In the relationship between the top label LA and the middle label LB in this variation, the top label LA is an example of the first print label and the middle label LB is an example of the second print label; the label data for the top label LA is an example of the first label data and the label data for the middle label LB is an example of the second label data; the print data included in the label data for the top label LA is an example of the first print data and the print data included in the label data for the middle label LB is an example of the second print data; the attribute specification information included in the label data for the top label LA is an example of the first attribute specification information and the attribute specification information included in the label data for the middle label LB is an example of the second attribute specification information; the label printer 3c is an example of the first printing device and the label printer 3a is an example of the second printing device; and the cartridge type information acquired from the label printer 3c is an example of the first medium type information and the cartridge type information acquired from the label printer 3a is an example of the second medium type information.

<Control Procedure>

An example of the control procedure executed by the CPU 11 of the operation terminal 2 according to the present variation to implement the method described above will be described with reference to the flowchart in FIG. 11. As in the present embodiment, the CPU 11 performs this control procedure by executing a printing process program according to the present variation. The printing process program is included in the programs stored in the ROM 12b. By executing this procedure, the CPU 11 implements the printing method according to the present variation described below.

Figure 11:
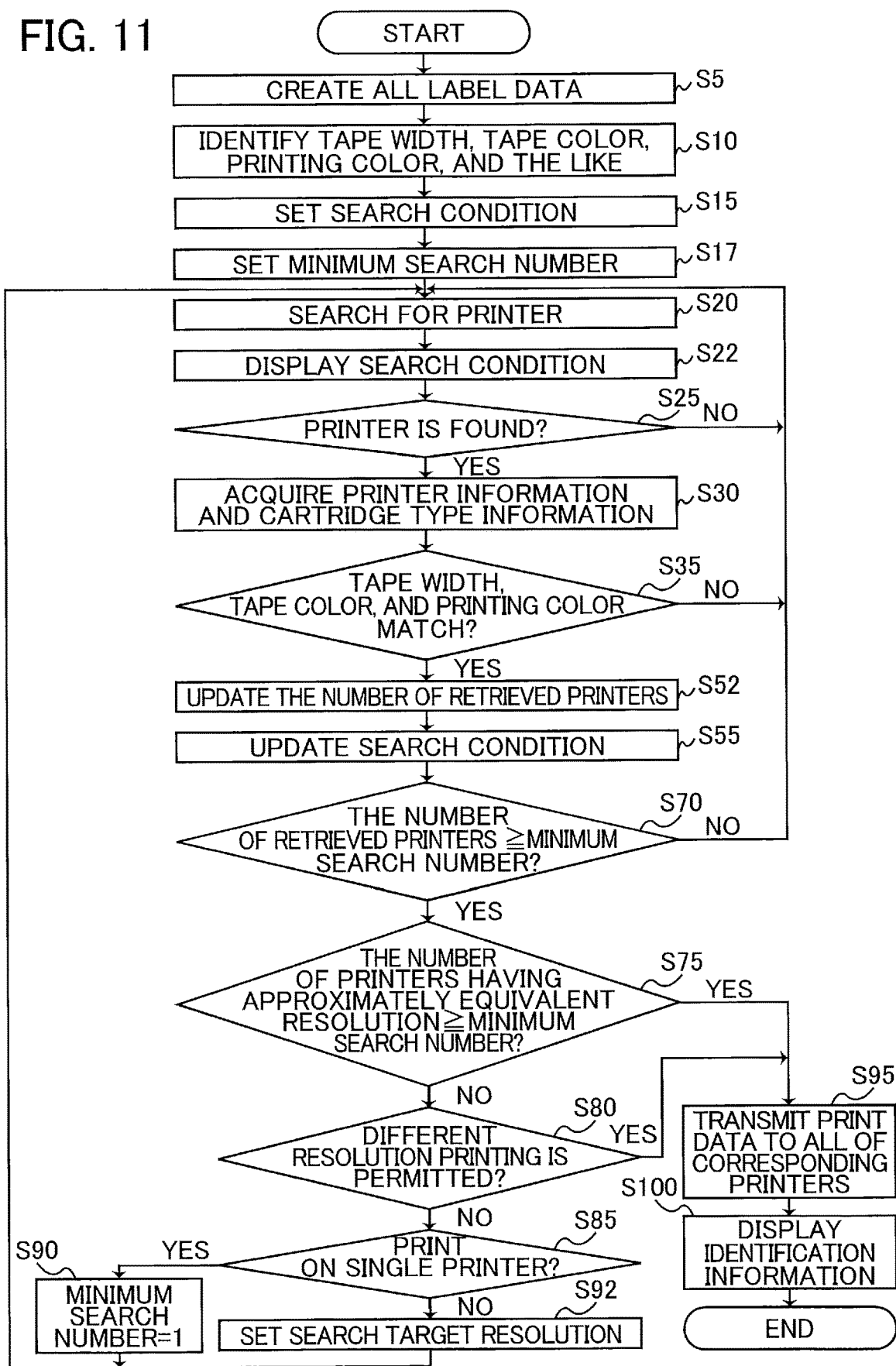
FIG. 11 is a flowchart illustrating a control procedure executed by a CPU of a terminal device according to the variation.

After completing steps S5, S10, and S15 that are identical to the same steps in FIG. 6, the CPU 11 advances to a new step S17 in FIG. 11. In S17 the CPU 11 receives a setting from the user via the operating unit 13 indicating a minimum search number. This minimum search number is set equivalent to the number of print labels L when a plurality of print labels L is to be created on a plurality of label printers 3, as described above. The minimum search number is used for searching for label printers 3 whose print heads 29 have an approximately equivalent printing resolution.

Next, the CPU 11 searches for the label printers 3 in S20, as described in FIG. 6 and subsequently advances to the new step S22. As in S65 of FIG. 6, in S22 the CPU 11 displays the search condition on the display unit 14. Hence, as in the present embodiment, the CPU 11 displays the specified tape widths, tape colors, and printing colors generated in S5 and identified in S10 together with examples of label printers 3 that are suitable for these cartridge attributes. Thus, as in step S65 of FIG. 6, the CPU 11 can clearly show the user what types of label printers 3 the operation terminal 2 is searching for, and the user can ready the relevant label printers 3 and cartridges 101.

After completing the process in S22 and processes in S25, S30, and S35 that are identical to those in FIG. 6, the CPU 11 advances to the new step S52. Note that the printing resolution information for the print head 29 is always included in the printer information acquired in S30 of this variation. In S52 the CPU 11 updates the number of label printers 3 that have been retrieved (i.e., the number of label printers 3 that have been determined in S35 to meet the search condition). Unlike in the process of FIG. 6, each time the CPU 11 finds a label printer 3 matching the above tape widths, tape colors, and printing colors (i.e., a label printer 3 meeting the search condition), the CPU 11 in the present variation increments the number of label printers 3 in S52 instead of transmitting print data to the label printer 3.

Next, the CPU 11 updates the search range and the search condition in S55, just as in FIG. 6. In this variation, the CPU 11 updates the search range to exclude therefrom the label printer 3 for which the number of retrieved label printers 3 has been incremented in S52. Further, the CPU 11 in this variation updates the search condition to exclude therefrom the attribute specification information that has been determined in S35 to perfectly match the cartridge type information of the label printer 3 for which the number of retrieved label printers 3 has been incremented in S52. Subsequently, the CPU 11 advances to the new step S70.

In S70 the CPU 11 determines whether the number of retrieved label printers 3 updated in S52 is greater than or equal to the minimum search number set in S17. The CPU 11 returns to S20 described above if the number of retrieved label printers 3 has not reached the minimum search number, and advances to S75 if the number of retrieved label printers 3 is greater than or equal to the minimum search number.

In S75 the CPU 11 determines whether the number of retrieved label printers 3 that have approximately equivalent printing resolutions is greater than or equal to the minimum search number. If the number of retrieved label printers 3 that have approximately equivalent printing resolutions is greater than or equal to the minimum search number (S75: YES), the CPU 11 advances to S95. Further, in S75 the CPU 11 sets, as output destinations for the print data, the retrieved label printers 3 that have been determined in S35 to satisfy the matching condition (i.e., match all of the specified tape width, tape color, and printing color) and have been determined in S75 to have approximately equivalent printing resolutions.

When advancing to S95 from S75, the CPU 11 transmits to the label printers 3 set as output destinations the corresponding print data, as in S45 of FIG. 6. The CPU 21c of the label printer 3 receives the print data from the operation terminal 2 via the communication control unit 23. In this way, the label printers 3 set as output destinations create the plurality of labels targeted for creation. In the above example, the label printers 3 create the labels LA-LC.

In S100 the CPU 11 displays, on the display unit 14, the identification information (such as model name information or serial number) of each label printer 3 to which print data has been transmitted in S95, the serial number of each set of the transmitted print data, and the like, as described in S50 of FIG. 6. Subsequently, the CPU 11 ends the process in FIG. 11.

On the other hand, if the CPU 11 determines in S75 that the number of retrieved label printers 3 that have an approximately equivalent printing resolution is less than the minimum search number (S75: NO), in S80 the CPU 11 displays on the display unit 14 an inquiry as to whether to permit to print with a label printer 3 having a different printing resolution. This is because the number of retrieved label printers 3 having an approximately equivalent printing resolution is not enough at this time, as described previously in FIG. 9. If the user performs an operation on the operating unit 13 to input a response of acceptance to the inquiry (S80: YES), the CPU 11 advances to S95 to create the labels LA-LC. In other words, in this case, the label printer 3 having a different printing resolution is included as an output destination for the print data.

However, if the user does not perform an operation via the operating unit 13 to input a response of acceptance to the inquiry (S80: NO), in S85 the CPU 11 displays on the display unit 14 an inquiry as to whether to permit to print two or more of the plurality of print labels L on one label printer 3. This is because the number of retrieved label printers 3 that have an approximately equivalent printing resolution is insufficient at this time, as described above. In this example, the CPU 11 displays on the display unit 14 an inquiry as to whether to permit to print all of the plurality of print labels L on one label printer 3.

If the user does not perform an operation on the operating unit 13 to input a response of acceptance to the inquiry (S85: NO), the CPU 11 advances to S92. However, if the user performs an operation on the operating unit 13 to input a response of acceptance to the inquiry (S85: YES), in S90 the CPU 11 sets the minimum search number to 1 and returns to S20. In this case, in S90 the CPU 11 resets the current search range and search condition and returns them to the search range and search condition initially set in S15. Then, when the CPU 11 advances S95 after returning to S20, the CPU 11 transmits all sets of print data generated in S5 to one printer 3. Thus, all the print labels L corresponding to all the transmitted sets of print data are created on the one label printer 3 while the user sequentially replaces the cartridge 101 with a corresponding one.

In S92 the CPU 11 receives a specification for the printing resolution to be used for creating the print labels L (in this example, the label LA-LC) from the user via the operating unit 13. Upon receiving the specification for the printing resolution, the CPU 11 resets the current range and search condition and returns them to the search range and search condition initially set in S15. Further, the CPU 11 adds, to the search condition, the user's specified printing resolution received in S92. Still further, the CPU 11 sets the minimum search number to a number that is greater than or equal to two (2) and is less than the number initially set in S17. In this example, the CPU 11 sets the minimum search number to two (2).

After completing the process in S92, the CPU 11 returns to S20. For example, in a case where after returning to S20, the CPU 11 finds two label printers 3 that have an approximately equivalent printing resolution to the user's specified printing resolution and advances to S95, the CPU 11 transmits two of the three sets of print data generated in S5 to one of the two label printers 3 and transmit the remaining one set of print data to the other of the two label printers 3. Thus, two print labels L corresponding to the transmitted two sets of print data are created on the one of the two label printers 3 while the user replaces the cartridge 101 with a corresponding one. Further, one print label L corresponding to the transmitted one sets of print data is created on the other of the two label printers 3.

The above-described specification is made in order to find at least two label printers 3 whose print heads 29 have approximately the same printing resolution. FIG. 10 described above shows a case in which two label printers 3a and 3c, both of which have a printing resolution of 300 dpi, are found. In the example of FIG. 10, two of the print labels L, and specifically the top label LA and bottom label LC, are created on the label printer 3c, while the remaining middle label LB is created on the label printer 3a.

<Effects of Variation>

This variation obtains the same effects described in the above-described embodiment. Additionally, the variation obtains the following effects.

Specifically, when setting output destinations for a plurality of sets of print data in the present variation, in S75 the CPU 11 sets a plurality of label printers 3 having approximately equivalent printing resolutions as the output destinations. Since the label printers 3 that receive the sets of print data in S95 create print labels L at approximately the same printing resolution, the printing quality of all print labels L can be maintained approximately uniform.

Here, while setting label printers 3 having approximately the same printing resolution as output destinations for the print data is the general rule, as described above, in some cases the number of such label printers 3 may be insufficient for the number of print labels L to be created. This variation handles such situations by setting an additional label printer 3, whose printing resolution is not considered approximately equivalent, as an output destination when outputting print data in S95, provided that the user inputs acceptance in S80. In this way, all of the print labels L targeted for creation can be reliably created by sacrificing only some uniformity in printing quality for the plurality of print labels L.

In the present variation, the CPU 11 first sets output destinations for print data provided for all of the print labels L and in S95 subsequently outputs this print data to each corresponding label printer 3, as described in S20-S80 and S95 of FIG. 11. In other words, after all output destinations for all sets of print data are determined, each of all the sets of print data is transmitted to the corresponding output destination. Thus, in S20-S70 the CPU 11 first confirms whether there exist label printers 3 suitable as output destinations for all sets of print data and in S95 subsequently outputs the sets of print data.

Accordingly, this method is ideal for such situations as when there are a large number of label printers 3 with a variety of cartridges 101 mounted therein or when it is known in advance that the cartridges 101 mounted in nearby label printers 3 are roughly suitable for the forms of print labels L to be created. Hence, a plurality of print labels L can be created more quickly using this method than when using a method such as that shown in FIG. 6 in which each time setting an output destination for print data for one print label L, the CPU 11 outputs the print data to that output destination.

(3) Other Variations

In the above description, the matching condition is satisfied when the tape width, tape color, and printing color of a label printer 3 match the tape width, tape color, and printing color specified by the attribute specification information included in the label data. In addition to this, the matching condition may require that the printing resolution of the print head 29 in the label printer 3 matches the printing resolution specified in advance by the label data. In this case, the CPU 11 sets the label printer 3 as the output destination for print data when the tape width, tape color, printing color, and printing resolution of the label printer 3 match the tape width, tape color, and printing color specified in the attribute specification information in the label data and the printing resolution specified in the print data of the label data.

Further, the numbers of print labels and label printers are not limited to the numbers used in the examples described above.

The present embodiment describes a laminating method in which printing is performed on a cover film 104 separate from the base tape 102, and the cover film 104 and base tape 102 are bonded together. However, the present disclosure may be applied to a method of printing on a print tape layer provided in the base tape (a non-laminating type).

Further, the flowcharts shown in FIGS. 6 and 11 do not limit the present disclosure to the steps indicated therein. Steps may be added or deleted, or their order may be rearranged, without departing from the spirit and technical ideas of the disclosure.

In addition to what has already been described, the methods according to the embodiment and its variations described above may be used in suitable combinations.

In addition, although not illustrated individually, the present disclosure may be implemented with various modifications.

What is claimed is:

1. A non-transitory computer-readable storage medium storing a set of computer-readable instructions for a terminal device, the terminal device including a processor and a communication interface enabling the terminal device to communicate with a plurality of printing devices in which a printing medium is mountable,
    the set of computer-readable instructions, when executed by the processor, causing the terminal device to perform:
    (a) generating a plurality of sets of label data for creating respective ones of a plurality of print labels to be overlaid on each other, each set of label data including a respective set of print data, so as to provide a plurality of sets of print data, each of the plurality of sets of print data indicating a printing content for the corresponding print label, each set of label data further including attribute specification information specifying printing medium attributes to be used to create the corresponding print label;
    (b) acquiring a plurality of sets of medium type information for respective ones of the plurality of printing devices through the communication interface, each set of medium type information indicating a type of the printing medium mounted in the corresponding printing device;
    (c) determining a plurality of output destinations for respective ones of the plurality of sets of print data, and each of the plurality of output destinations, in such determining, selected from among the plurality of printing devices on the basis of the plurality of sets of label data generated in (a) and the plurality of sets of medium type information acquired in (b),
        such that each of the plurality of output destinations corresponds to a respective printing device, of the plurality of printing devices; and
    (d) transmitting each of the plurality of sets of print data to the respective output destination determined in (c),
    wherein the processing of (c) and (d) is performed such that only after all of the plurality of output destinations for respective ones of the plurality of sets of print data are determined in (c), each of all the plurality of sets of print data is transmitted in (d) to the respective output destination determined in (c).

2. The non-transitory computer-readable storage medium according to claim 1,
    wherein the determining in (c) comprises:
    (e) determining, for each of the plurality of sets of medium type information, whether a matching condition is met between the medium type information and any of the plurality of sets of attribute specification information; and
    (f) determining, when determining in (e) that the matching condition is met between one of the plurality of sets of medium type information and one of the plurality of sets of attribute specification information, the printing device corresponding to the one of the plurality of sets of medium type information as the output destination for the print data included in the label data containing the one of the plurality of sets of attribute specification information.

3. The non-transitory computer-readable storage medium according to claim 2,
    wherein, when the matching condition is determined in (e) to be met between one set of attribute specification information and one of the plurality of sets of medium type information whereas the matching condition is determined in (e) not to be met between another set of attribute specification information and any of the plurality of sets of medium type information, the printing device corresponding to the one of the plurality of sets of medium type information is determined in (c) as not only the output destination for the print data included in the label data containing the one set of attribute specification information but also the output destination for the print data included in the label data containing the another set of attribute specification information.

4. The non-transitory computer-readable storage medium according to claim 1,
    wherein the set of computer-readable instructions, when executed by the processor, causes the terminal device to further perform:
    (g) acquiring a plurality of sets of printing resolution information for respective ones of the plurality of printing devices through the communication interface, each set of printing resolution information indicating a printing resolution of the corresponding printing device, and
    wherein the plurality of output destinations are determined from among specific printing devices of the plurality of printing devices, the specific printing devices having equivalent printing resolutions.

5. The non-transitory computer-readable storage medium according to claim 4,
    wherein, in a case where the number of the specific printing devices is insufficient for the number of the plurality of sets of label data generated in (a), the printing device in which an absolute value of a deviation of the printing resolution indicated by the corresponding printing resolution information is greater than a predetermined threshold value is determined as the output destination in (c), the deviation of the printing resolution of a printing device being calculated by subtracting, from the printing resolution of the printing device, an average value of a group consisting of the printing resolution of the printing device and the printing resolutions of the specific printing devices already determined as the output destination in (c).

6. The non-transitory computer-readable storage medium according to claim 4,
wherein the terminal device includes a display unit, and
wherein the set of computer-readable instructions, when executed by the processor, causes the terminal device to further perform:
(k) displaying, in a case where the number of the specific printing devices is insufficient for the number of the plurality of sets of label data, an inquiry as to whether to permit use of the printing device whose printing resolution is different from that of the specific printing device.

7. The non-transitory computer-readable storage medium according to claim 1,
wherein each set of print data includes at least one of:
a character or a pattern or an image;
a printing color to be used when printing; and
a printing resolution to be used when printing, and
wherein each set of medium type information includes at least one of:
a width of a printing medium;
a color of a printing medium; and
material of a printing medium.

8. The non-transitory computer-readable storage medium according to claim 1,
wherein each printing device includes a mounting portion in which a medium accommodation body capable of supplying the printing medium is detachably mountable, and
wherein each set of medium type information is accommodation body type information indicating a type of the medium accommodation body mounted in the mounting portion of the corresponding printing device.

9. The non-transitory computer-readable storage medium according to claim 1,
wherein the terminal device includes a display unit, and
wherein the set of computer-readable instructions, when executed by the processor, causes the terminal device to further perform:
(h) acquiring a plurality of sets of device identification information for respective ones of the plurality of printing devices through the communication interface; and
(i) displaying, on the display unit, the device identification information for each printing device determined as the output destination in (c).

10. The non-transitory computer-readable storage medium according to claim 1,
wherein the terminal device includes a display unit, and
wherein the set of computer-readable instructions, when executed by the processor, causes the terminal device to further perform:
(h) acquiring a plurality of sets of device identification information for respective ones of the plurality of printing devices through the communication interface; and
(i) displaying, on the display unit, the device identification information for each printing device determined as the output destination in (c).

11. The non-transitory computer-readable storage medium according to claim 1, wherein the attribute specification information included in each of the plurality of sets of label data specifies, as the printing medium attributes, at least one of:
a width of a printing medium;
a color of a printing medium; and
a printing color.

12. The non-transitory computer-readable storage medium according to claim 1, wherein the attribute specification information included in each of the plurality of sets of label data specifies, as the printing medium attribute, a different printing color from the others.

13. The non-transitory computer-readable storage medium according to claim 1, wherein the attribute specification information included in each of the plurality of sets of label data specifies, as the printing medium attributes:
a width of a printing medium;
a color of a printing medium; and
a printing color.

14. A printing process method of using a plurality of printing devices to create a plurality of print labels to be overlaid on each other, the plurality of print labels including a first print label and a second print label, the printing process method comprising:
(a) generating:
first label data for creating the first print label, the first label data including a first set of print data and first attribute specification information, the first set of print data indicating a first printing content for the first print label, the first attribute specification information specifying printing medium attributes to be used to create the first print label; and
second label data for creating the second print label, the second label data including a second set of print data and second attribute specification information, the second set of print data indicating a second printing content for the second print label, the second attribute specification information specifying printing medium attributes to be used to create the second print label;
(b) acquiring first medium type information indicating a type of a printing medium mounted in a first printing device;
(c) acquiring second medium type information indicating a type of a printing medium mounted in a second printing device;
(d) determining the first printing device, selected from the plurality of printing devices, as corresponding to a first output destination for the first set of print data when the first medium type information matches the first attribute specification information;
(e) determining the second printing device, selected from the plurality of printing devices, as corresponding to a second output destination for the second set of print data when the second medium type information matches the second attribute specification information; and
(f) transmitting, only after the first printing device is determined in (d) as the first output destination for the first set of print data and only after the second printing device is determined in (e) as the second output destination for the second set of print data, the first set of print data and the second set of print data to the first printing device and the second printing device, respectively.

15. A non-transitory computer-readable storage medium storing a set of computer-readable instructions for a terminal device to create a plurality of print labels to be overlaid on each other, the terminal device including a processor and a communication interface, the plurality of print labels including a first print label and a second print label, the set of computer-readable instructions, when executed by the processor, causing the terminal device to perform:

(a) generating:

first label data for creating the first print label, the first label data including a first set of print data and first attribute specification information, the first set of print data indicating a first printing content for the first print label, the first attribute specification information specifying printing medium attributes to be used to create the first print label; and second label data for creating the second print label, the second label data including a second set of print data and second attribute specification information, the second set of print data indicating a second printing content for the second print label, the second attribute specification information specifying printing medium attributes to be used to create the second print label;

(b) acquiring, through the communication interface, first medium type information indicating a type of a printing medium mounted in a first printing device;

(c) acquiring, through the communication interface, second medium type information indicating a type of a printing medium mounted in a second printing device;

(d) determining the first printing device, selected from a plurality of printing devices, as corresponding to a first output destination for the first set of print data when the first medium type information matches the first attribute specification information;

(e) determining the second printing device, selected from the plurality of printing devices, as corresponding to a second output destination for the second set of print data when the second medium type information matches the second attribute specification information; and (f) transmitting, only after the first printing device is determined in (d) as the first output destination for the first set of print data and only after the second printing device is determined in (e) as the second output destination for the second set of print data, the first set of print data and the second set of print data to the first printing device and the second printing device, respectively.

* * * * *